US012312509B2

(12) United States Patent
Townsend et al.

(10) Patent No.: US 12,312,509 B2
(45) Date of Patent: May 27, 2025

(54) ADHESIVE ARTICLE COMPRISING POLYMER AND POLYMERIZABLE CYCLIC OLEFINS, ADHESIVE COMPOSITIONS AND METHODS

(71) Applicant: 3M INNOVATIVE PROPERTIES COMPANY, St. Paul, MN (US)

(72) Inventors: Erik M. Townsend, South St. Paul, MN (US); Kelly A. Volp, Minneapolis, MN (US); Mario A. Perez, Burnsville, MN (US); Binhong Lin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 357 days.

(21) Appl. No.: 17/777,670

(22) PCT Filed: Dec. 11, 2020

(86) PCT No.: PCT/IB2020/061810
§ 371 (c)(1),
(2) Date: May 18, 2022

(87) PCT Pub. No.: WO2021/124043
PCT Pub. Date: Jun. 24, 2021

(65) Prior Publication Data
US 2023/0014501 A1    Jan. 19, 2023

Related U.S. Application Data

(60) Provisional application No. 62/951,013, filed on Dec. 20, 2019.

(51) Int. Cl.
| | |
|---|---|
| *C09J 7/20* | (2018.01) |
| *C09J 4/06* | (2006.01) |
| *C09J 7/38* | (2018.01) |
| *C09J 133/10* | (2006.01) |

(52) U.S. Cl.
CPC ............... *C09J 7/203* (2018.01); *C09J 4/06* (2013.01); *C09J 7/385* (2018.01); *C09J 133/10* (2013.01); *C09J 2301/302* (2020.08); *C09J 2301/312* (2020.08)

(58) Field of Classification Search
CPC ..... C09J 7/203; C09J 4/06; C09J 7/385; C09J 133/10; C09J 2301/302; C09J 2301/312; C09J 165/00; C09J 7/10; C09J 2433/00; C09J 2465/00; C09J 7/30; C09J 7/20; C09J 133/00; C08L 65/00; C08L 33/00; C08G 2261/3324; C08G 2261/3325; C08G 2261/418; C08G 2261/62; C08G 61/08

See application file for complete search history.

(56) References Cited

U.S. PATENT DOCUMENTS

| | | |
|---|---|---|
| 3,708,296 A | 1/1973 | Schlesinger |
| 3,857,825 A | 12/1974 | Streck |
| 4,069,055 A | 1/1978 | Crivello |
| 4,216,288 A | 8/1980 | Crivello |
| 4,250,311 A | 2/1981 | Crivello |
| 4,330,590 A | 5/1982 | Vesley |
| 4,412,038 A | 10/1983 | Zerpner |
| 5,084,586 A | 1/1992 | Farooq |
| 5,124,417 A | 6/1992 | Farooq |
| 5,312,940 A | 5/1994 | Grubbs |
| 5,506,279 A | 4/1996 | Babu |
| 5,536,561 A | 7/1996 | Turi |
| 5,554,664 A | 9/1996 | Lamanna |
| 5,753,721 A | 5/1998 | Hafner |
| 5,854,299 A | 12/1998 | Muehlebach |
| 5,861,443 A | 1/1999 | Hafner |
| 5,902,836 A | 5/1999 | Bennett |
| 5,922,802 A | 7/1999 | Setiabudi |
| 5,939,496 A * | 8/1999 | Ungefug ............. C08F 8/44 525/369 |
| 5,963,731 A | 10/1999 | Sagawa |
| 5,976,690 A | 11/1999 | Williams |
| 6,107,420 A | 8/2000 | Grubbs |
| 6,162,883 A | 12/2000 | Muehlebach |
| 6,235,856 B1 | 5/2001 | Hafner |
| 6,281,307 B1 | 8/2001 | Muehlebach |
| 6,323,295 B1 | 11/2001 | Muehlebach |
| 6,407,190 B1 | 6/2002 | Van Der Schaaf |

(Continued)

FOREIGN PATENT DOCUMENTS

| | | |
|---|---|---|
| CA | 2242060 | 1/1999 |
| CA | 2839757 | 1/2021 |

(Continued)

OTHER PUBLICATIONS

Penzel et al., "Polyacrylates", Ullman's Encyclopedia of Industrial Chemistry, 2018. (Year: 2018).*
Li et al., "Fluorinated Poly(meth)acrylate: Synthesis and properties", Nov. 2014, Polymer 55(24), https://www.researchgate.net/publication/266321301_Fluorinated_Polymethacrylate_Synthesis_and_properties. (Year: 2014).*

(Continued)

*Primary Examiner* — Christopher W Raimund
(74) *Attorney, Agent, or Firm* — Carolyn A. Fischer

(57) ABSTRACT

Adhesive composition and articles are described comprising a carrier substrate (e.g. release liner or backing) and an adhesive composition disposed on the carrier substrate. The adhesive composition comprises at least 20 wt. % of a polymer; unpolymerized cyclic olefin; and a (e.g. latent) ring opening metathesis polymerization catalyst or precatalyst thereof. The polymer may have a Tg less than 25° C. and/or may be an acrylic polymer. Also described is a method of bonding.

16 Claims, No Drawings

(56) References Cited

U.S. PATENT DOCUMENTS

| | | |
|---|---|---|
| 6,465,554 B1 | 10/2002 | Van Der Schaaf |
| 6,525,125 B1 | 2/2003 | Giardello |
| 6,627,384 B1 | 9/2003 | Kim |
| 6,800,170 B2 | 10/2004 | Kendall |
| 6,872,792 B2 | 3/2005 | Kendall |
| 6,973,949 B1 | 12/2005 | Tokas |
| 7,025,851 B2 | 4/2006 | Caster |
| 7,365,140 B2 | 4/2008 | Piers |
| 7,514,202 B2 | 4/2009 | Ohsawa |
| 7,538,172 B2 | 5/2009 | Moszner |
| 7,820,355 B2 | 10/2010 | Kurakata |
| 8,278,449 B2 | 10/2012 | Khosravi |
| 8,703,888 B2 | 4/2014 | Drozdzak |
| 8,722,828 B2 | 5/2014 | Sugawara |
| 8,981,024 B2 | 3/2015 | Slugovc |
| 9,207,532 B2 | 12/2015 | Weitekamp |
| 9,321,832 B2 | 4/2016 | Tomlinson |
| 9,610,572 B2 | 4/2017 | Grela |
| 9,751,975 B2 | 9/2017 | Cruce |
| 9,796,889 B2 | 10/2017 | Giardello |
| 9,815,675 B1 | 11/2017 | Gray |
| 10,239,965 B2 | 3/2019 | Cruce |
| 2002/0015519 A1 | 2/2002 | Tokas |
| 2002/0053379 A1 | 5/2002 | Tokas |
| 2002/0055598 A1 | 5/2002 | Lynn |
| 2002/0153096 A1 | 10/2002 | Giardello |
| 2002/0166629 A1 | 11/2002 | Caster |
| 2002/0198356 A1 | 12/2002 | Dershem |
| 2003/0003317 A1 | 1/2003 | Chang |
| 2003/0151025 A1 | 8/2003 | Yang |
| 2004/0068036 A1 | 4/2004 | Halladay |
| 2005/0205203 A1 | 9/2005 | Chang |
| 2006/0052487 A1 | 3/2006 | Cruce |
| 2007/0112065 A1 | 5/2007 | Feng |
| 2007/0199649 A1 | 8/2007 | Sompalli |
| 2009/0218504 A1 | 9/2009 | Pelizzo |
| 2009/0227809 A1 | 9/2009 | Yang |
| 2009/0272436 A1 | 11/2009 | Cheung |
| 2010/0003432 A1 | 1/2010 | Schiffman |
| 2010/0173905 A1 | 7/2010 | Shen |
| 2011/0003905 A1 | 1/2011 | Buchmeiser |
| 2012/0058275 A1 | 3/2012 | Giardello |
| 2013/0209003 A1 | 8/2013 | Hansen |
| 2014/0035186 A1 | 2/2014 | Recher |
| 2014/0044980 A1 | 2/2014 | Schiffmann |
| 2014/0088260 A1 | 3/2014 | Giardello |
| 2014/0147688 A1 | 5/2014 | Corral |
| 2014/0329017 A1 | 11/2014 | Wang |
| 2014/0370318 A1 | 12/2014 | Stephen |
| 2015/0118188 A1 | 4/2015 | Weitekamp |
| 2015/0152283 A1 | 6/2015 | Stephen |
| 2015/0158271 A1 | 6/2015 | Hoshino |
| 2015/0165652 A1 | 6/2015 | Giardello |
| 2015/0166767 A1 | 6/2015 | Cruce |
| 2016/0226114 A1 | 8/2016 | Hartmann |
| 2016/0326304 A1 | 11/2016 | Stephen |
| 2017/0125756 A1 | 5/2017 | Nietling |
| 2017/0130089 A1 | 5/2017 | Stephen |
| 2017/0200995 A1 | 7/2017 | Phlegm |
| 2017/0233876 A1 | 8/2017 | Giardello |
| 2018/0019508 A1 | 1/2018 | Lee |
| 2018/0037677 A1 | 2/2018 | Cruce |
| 2018/0067393 A1 | 3/2018 | Weitekamp |
| 2018/0237581 A1 | 8/2018 | Stephen |
| 2019/0048130 A1 | 2/2019 | Rhodes |
| 2020/0153096 A1 | 5/2020 | Henry |

FOREIGN PATENT DOCUMENTS

| | | |
|---|---|---|
| CN | 106985319 | 7/2017 |
| CN | 109401676 | 3/2019 |
| DE | 202006020148 | 12/2007 |
| DE | 102017130504 | 6/2019 |
| EP | 0824125 | 2/1998 |
| EP | 0889107 | 7/1999 |
| EP | 1363967 | 4/2006 |
| EP | 1652885 | 5/2006 |
| EP | 2100729 | 9/2009 |
| EP | 2540492 | 1/2013 |
| EP | 2439149 | 7/2013 |
| EP | 2982709 | 2/2016 |
| EP | 3144140 | 3/2017 |
| EP | 3466658 | 4/2019 |
| GB | 2319746 | 5/2000 |
| JP | H01-167168 | 6/1989 |
| JP | H05-262374 | 10/1993 |
| JP | H06-275137 | 9/1994 |
| JP | H06-314860 | 11/1994 |
| JP | H11-157233 | 6/1999 |
| JP | 2000-336320 | 12/2000 |
| JP | 2001/040308 | 2/2001 |
| JP | 2011-037274 | 2/2001 |
| JP | 2002-029181 | 1/2002 |
| JP | 2002-219788 | 8/2002 |
| JP | 2003-043495 | 2/2003 |
| JP | 2003-155073 | 5/2003 |
| JP | 2003-225977 | 8/2003 |
| JP | 2006-027086 | 2/2006 |
| JP | 2006-243315 | 9/2006 |
| JP | 2007-311592 | 11/2007 |
| JP | 2014-051588 | 3/2014 |
| JP | 2014-234417 | 12/2014 |
| JP | 2015-003963 | 1/2015 |
| JP | 2015-003964 | 1/2015 |
| JP | 2015-003994 | 1/2015 |
| JP | 2015-003995 | 1/2015 |
| KR | 2002-0096479 | 12/2002 |
| KR | 10-0864555 | 10/2008 |
| WO | WO 1993-024321 | 12/1993 |
| WO | WO 1998-036005 | 8/1998 |
| WO | WO 2000-066676 | 11/2000 |
| WO | WO 2001-067523 | 9/2001 |
| WO | WO 2002-026858 | 4/2002 |
| WO | WO 2008-040404 | 4/2008 |
| WO | WO 2009-087758 | 7/2009 |
| WO | WO 2009-092721 | 7/2009 |
| WO | WO 2010-096445 | 8/2010 |
| WO | WO 2012-099882 | 7/2012 |
| WO | WO 2012-174502 | 12/2012 |
| WO | WO 2013-132008 | 9/2013 |
| WO | WO 2014-144634 | 9/2014 |
| WO | WO 2015-003147 | 1/2015 |
| WO | WO 2015-106210 | 7/2015 |
| WO | WO 2016-100101 | 6/2016 |
| WO | WO 2016-130743 | 8/2016 |
| WO | WO 2017-134673 | 8/2017 |
| WO | WO 2018-045132 | 3/2018 |
| WO | WO 2019-070819 | 4/2019 |
| WO | WO 2020-121244 | 6/2020 |
| WO | WO 2020-123946 | 6/2020 |
| WO | WO 2020-250154 | 12/2020 |
| WO | WO 2021-074734 | 4/2021 |
| WO | WO 2021-074749 | 4/2021 |
| WO | WO 2021-124156 | 6/2021 |
| WO | WO 2021-202485 | 10/2021 |
| WO | WO 2022-053921 | 3/2022 |
| WO | WO 2022-101746 | 5/2022 |
| WO | 2022/219427 A1 | 10/2022 |

OTHER PUBLICATIONS

Mojtaba et al., "Rheological and Adhesion Properties of Acrylic Pressure-Sensitive Adhesives", J. App. Poly. Sci., vol. 120, pp. 411-418, Oct. 14, 2010. (Year: 2010).*

International Search Report for PCT International Application No. PCT/IB2020/062037, mailed on Mar. 19, 2021, 5 pages.

International Search Report for PCT International Application No. PCT/IB2020/059476, mailed on Jan. 25, 2021, 6 pages.

International Search Report for PCT International Application No. PCT/IB2020/061810, mailed on Feb. 26, 2021, 4 pages.

International Search Report for PCT International Application No. PCT/IB2020/059215, mailed on Jan. 20, 2021, 5 pages.

International Search Report for PCT International Application No. PCT/IB2020/052175, mailed on Jun. 15, 2022, 5 pages.

(56) References Cited

OTHER PUBLICATIONS

Carlson, "The Metathesis-Facilitated Synthesis of Terminal Ruthenium Carbide Complexes: A Unique Carbon Atom Transfer Reaction", Journal of the American Chemical Society, Feb. 27, 2002, vol. 124, No. 8, pp. 1580-1581.
Cray Valley Product Guide, A Brand of Total, 2019, 16 pages.
Dietliker, "Chemistry & Technology of UV & EB Formulation for Coatings", Inks & Paints, SITA Technology, 1991, vol. III, pp. 276-298.
Haag, "Functionalized Polybutadiene Oils as Adhesion Promoters for Mineral Fillers in Rubber Compounds", Die Angewandte Makromolekulare Chemie. Applied Macromolecularchemistry and Physics, Aug. 1989, vol. 171, No. 1, pp. 1-19.
Keitz, "A Tandem Approach to Photoactivated Olefin Metathesis: Combining a Photoacid Generator with an Acid Activated Catalyst", Journal of the American Chemical Society, Feb. 2009, vol. 131, No. 6, pp. 2038-2039.
Khalimon, "Photogeneration of a Phosphonium Alkylidene Olefin Metathesis Catalyst", Organometallics, Aug. 2012, vol. 31, No. 15, pp. 5634-5637.
Kirk-Othmer Encyclopedia of Chemical Technology, Fourth Edition, Supplement Volume, John Wiley and Sons, New York, 1998, pp. 253-255.
Lemcoff, "Light-induced olefin metathesis", Beilstein Journal of Organic Chemistry, 2010, vol. 6, pp. 1106-1119.
Lin, "Compositions Comprising Cyclic Olefins and Thermally Conductive Filler and Adhesion Promoter", Application No. IB2022/052175, filed Mar. 10, 2022, 30 pages.
Monsaert, "Latent olefin metathesis catalysts", Chemical Society Reviews, 2009, vol. 38, pp. 3360-3372.
Product Broacher: "Martoxid TM-4000 Series", A Product of J. M. Huber Corporation, Oct. 2016, 9 pages.
Product Brochure: "Find your highlight. Change your perspective with our latest innovations for Adhesives & Sealants" Evonik Industries, (Date unknown but believed to be prior to the date of the filing of the present application.), 20 pages.
Product Datasheet: "Baytec ME230", A Product of Covestro LLC, Jan. 2012, 4 pages.
Product Datasheet: "DESMODUR E 28", A Product of Covestro LLC, Oct. 2017, 2 pages.
Product Information: "Martoxid TM 2250", A Product of Martinswerk (A Huber Cmpany), Apr. 2018, 2 pages.
Product Information: "MoldX A110 Aluminum Hydroxide (ATH)", A Product of J. M. Huber Corporation, Nov. 2018, 1 page.
Product Information: "POLYVEST EP ST-E 60, Experimental Product (EP) Triethoxysilane-terminated liquid polybutadiene", A Product of Evonik, (Date unknown but believed to be prior to the date of the filing of the present application.), 3 pages.
Product Information: "POLYVEST MA 75", A Product of Evonik, Jan. 2019, 2 pages.
Product Information: "Ricon 131 Maleinized Polybutadiene", A Product of Cray Valley, Jan. 2010, 1 page.
Product Information: "Spherical Alumina", A Product of Bestry, (Date unknown but believed to be prior to the date of the filing of the present application.), 2 pages.
Technical Data Sheet: "RICON 131 Polybutadiene", A Product of Cray Valley, Jun. 2010, 1 page.
Zhu, "Thermal conductivity of amorphous Sio2 thin film: A molecular dynamics study". Scientific Reports, Jul. 2018, Vo. 8, No. 1, pp. 1-9.

\* cited by examiner

ADHESIVE ARTICLE COMPRISING POLYMER AND POLYMERIZABLE CYCLIC OLEFINS, ADHESIVE COMPOSITIONS AND METHODS

SUMMARY

In one embodiment, an adhesive article is described comprising a carrier substrate (e.g. release liner or backing) and an adhesive composition disposed on the carrier substrate. The adhesive composition comprises at least 20 wt. % of a polymer having a glass transition temperature (Tg) of less than 25° C.; unpolymerized cyclic olefin; and a latent ring opening metathesis polymerization catalyst or precatalyst thereof.

In another embodiment, an adhesive composition is described comprising:
at least 20 wt. % of a polymer; unpolymerized cyclic olefin; and a latent ring opening metathesis polymerization catalyst or precatalyst thereof, wherein the catalyst or precatalyst thereof is activatable with actinic radiation.

In another embodiment, an adhesive composition is described comprising:
at least 20 wt. % of an acrylic polymer; unpolymerized cyclic olefin; and a ring opening metathesis polymerization catalyst or precatalyst thereof.

In another embodiment, an adhesive composition is described comprising at least 50 wt. % of a polymer; unpolymerized cyclic olefin; and a ring opening metathesis polymerization catalyst or precatalyst thereof.

In another embodiment a method of bonding is described comprising providing an adhesive article or adhesive composition as described herein; disposing the adhesive between a first substrate and second substrate; and polymerizing the cyclic olefin.

DETAILED DESCRIPTION

The adhesive compositions described herein comprise one or more unpolymerized cyclic olefins. The cyclic olefins are generally mono-unsaturated (i.e. mono-olefin) or poly-unsaturated (i.e. comprising two or more carbon-carbon double bonds or in other words alkene groups). The double bond or in other words ethylenic unsaturation is not part of a (meth)acrylate or vinyl ether group. The cyclic olefin may be mono- or poly-cyclic (i.e. comprising two or more cyclic groups). The cyclic olefin may generally be a strained or unstrained cyclic olefin, provided the cyclic olefin is able to participate in a ROMP reaction either individually or as part of a ROMP cyclic olefin composition.

The polymerizable adhesive composition comprise cyclic diene monomers, including for example 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, norbornadiene, cyclohexenylnorbornene, including oligomers thereof such as dimers, trimers, tetramers, pentamers, etc. The polyolefin cyclic materials are amenable to thermosetting.

In some embodiments, the polymerizable adhesive composition comprises dicyclopentadiene (DCPD), depicted as follows:

Various DCPD suppliers and purities may be used such as Lyondell 108 (94.6% purity), Veliscol UHP (99+% purity), Cymetech Ultrene (97% and 99% purities), and Hitachi (99+% purity).

In some embodiments, the composition comprises cyclopentadiene oligomers including trimers, tetramers, pentamers, and the like; depicted as follows:

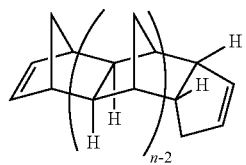

cyclopentadiene oligomers, n is typically 3, 4 or 5.

In some embodiments, the composition comprises cyclic diene monomer in the absence of mono-olefins.

In other embodiments, the composition further comprises a cyclic mono-olefin. Examples include cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

In some embodiments, the composition further comprises norbornene, depicted as follows:

Suitable norbornene monomers include substituted norbornenes such as norbornene dicarboxylic anhydride (nadic anhydride); and as well as alkyl and cycloalkyl norbornenes including butyl norbornene, hexyl norbornene, octyl norbornene, decyl norbornene, and the like.

The cyclic olefin monomers and oligomers may optionally comprise substituents provided the monomer, oligomer, or mixture is suitable for metathesis reactions. The carbon atoms of the cyclic olefin moiety may optionally comprise substituents derived from radical fragments including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the olefin may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carbodiimide, carboalkoxy, carbamate, halogen, or pseudohalogen. Similarly, the olefin may be substituted with one or more groups such as C1-C20 alkyl, aryl, acyl, C1-C20 alkoxide, aryloxide, C3-C20 alkyldiketonate, aryldiketonate, C1-C20 carboxylate, arylsulfonate, C1-C20 alkylsulfonate, C1-C20 alkylthio, arylthio, C1-C20 alkylsulfonyl, C1-C20 alkylsulfinyl, C1-C20 alkylphosphate, and arylphosphate.

Preferred cyclic olefins can include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. More preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

The cyclic olefins may be used alone or mixed with each other in various combinations to adjust the properties of the olefin monomer composition. For example, mixtures of cyclopentadiene dimer and trimers offer a reduced melting point and yield cured olefin copolymers with increased mechanical strength and stiffness relative to pure polyDCPD. As another example, incorporation of norbornene, or alkyl norbornene comonomers tend to yield cured olefin copolymers that are relatively soft and rubbery.

In some embodiments, the cyclic olefin material comprises a mixture of DCPD monomer and cyclopentadiene oligomer. In some embodiments, the mixture comprises at least 25, 30, 35, 40 or 45 wt. % DCPD based on the total amount of cyclic olefin monomer(s) and oligomer(s). In some embodiments, the mixture comprises no greater than 75, 70, 65, 60, 55, or 50 wt. % DCPD based on the total amount a cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount of cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount of cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer.

In some embodiments, the cyclic olefin material comprises a mixture of DCPD monomer and cyclopentadiene oligomer, in the absence of mono-olefins or in combination with a low concentration of mono-olefin. In this embodiment, the amount of mono-olefin is less than 25, 20, 15, 10, 9, 8, 7, 6, 5, 4, 3, 2, or 1 wt. % based on the total amount of cyclic olefin monomer(s) and oligomer(s).

In other embodiments, the mixture comprises at least 25, 30, 35, 40 or 45 wt. % of a mono-olefin such as a substituted norbornene, based on the total amount of cyclic olefin monomer(s) and oligomer(s). In some embodiments, the mixture comprises no greater than 75, 70, 65, 60, 55, or 50 wt. % mono-olefin (e.g. C4-C12 (e.g. C8) alkyl norbornene) based on the total amount a cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount a cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount of cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer. In some embodiments, the mixture comprises no greater than 5, 4, 3, 2, or 1 wt. % of DCPD monomer. In other embodiments, the mixture comprises no greater than 25 or 20 wt. % of DCPD monomer.

The adhesive composition comprises at least 10, 11, 12, 14, or 15 wt. % of cyclic olefin (i.e. polyolefin and optional mono-olefin) of the sum of cyclic olefin(s) and polymer. In some embodiments, the amount of cyclic olefin is at least 16, 17, 18, 19, or 20 wt. % of the sum of cyclic olefin(s) and polymer. In some embodiments, the amount of cyclic olefin is at least 25, 30, 35, 40, 45, or 25 wt. % of the sum of cyclic olefin(s) and polymer. The amount of cyclic olefin (i.e. polyolefin and optional mono-olefin) is typically no greater than 80 wt. % of the sum of cyclic olefin(s) and polymer. In some embodiments, the amount of cyclic olefin is no greater than 75, 70, 55, 60, 55, or 50 wt. % of the sum or cyclic olefin(s) and polymer.

Various cyclic olefins are commercially available from Materia.

The adhesive compositions described herein are prepared by the metathesis of cyclic olefins polymerized with a metal carbene catalyst. Group 8 transition metals, such as ruthenium and osmium, carbene compounds have been described as effective catalysts for ring opening metathesis polymerization (ROMP). See for example U.S. Pat. No. 10,239,965; incorporated herein by reference.

In typical embodiments, the catalyst is a metal carbene olefin metathesis catalyst. Such catalysts typically have the following structure:

(Catalyst Formula I)

wherein

M is a Group 8 transition metal;

$L^1$, $L^2$, and $L^3$ are independently neutral electron donor ligands;

n is 0 or 1;

m is 0, 1, or 2;

k is 0 or 1;

$X^1$ and $X^2$ are independently anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups.

Typical metal carbene olefin metathesis catalysts contain Ru or Os as the Group 8 transition metal, with Ru being preferred.

A first group of metal carbene olefin metathesis catalysts are commonly referred to as First Generation Grubbs-type catalysts, and have the structure of Catalyst Formula (I). For the first group of metal carbene olefin metathesis catalysts, M is a Group 8 transition metal, m is 0, 1, or 2, and n, $X^1$, $X^2$, $L^1$, $L^2$, and $L^3$ are described as follows.

For the first group of metal carbene olefin metathesis catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Typical trisubstituted phosphines are of the formula $PR^{H1}R^{H2}R^{H3}$, where $R^{H1}$, $R^{H2}$, and $R^{H3}$ are each independently substituted or unsubstituted aryl or C1-C10 alkyl, particularly primary alkyl, secondary alkyl, or cycloalkyl. In some embodiments, $L^1$ and $L^2$ are independently selected from the group consisting of trimethylphosphine (PMe₃), triethylphosphine (PEt₃), tri-n-butylphosphine (PBu₃), tri(ortho-tolyl)phosphine (P-o-tolyl₃), tri-tert-butylphosphine (P-tert-Bu₃), tricyclopentylphosphine (PCyclopentyl₃), tricyclohexylphosphine (PCy₃), triisopropylphosphine (P-i-Pr₃), trioctylphosphine (POct₃), triisobutylphosphine, (P-i-Bu₃), triphenylphosphine (PPh₃), tri(pentafluorophenyl)phosphine (P(C₆F₅)₃), methyldiphenylphosphine (PMePh₂), dimethylphenylphosphine (PMe₂Ph), and diethylphenylphosphine (PEt₂Ph). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like.

$X^1$ and $X^2$ are anionic ligands, and may be the same or different, or are linked together to form a cyclic group, typically although not necessarily a five- to eight-membered ring. In some embodiments, $X^1$ and $X^2$ are each independently hydrogen, halide, or one of the following groups: C1-C20 alkyl, C5-C24 aryl, C1-C20 alkoxy, C5-C24 aryloxy, C2-C20 alkoxycarbonyl, C6-C24 aryloxycarbonyl, C2-C24 acyl, C2-C24 acyloxy, C1-C20 alkylsulfonato, C5-C24 arylsulfonato, C1-C20 alkylsulfanyl, C5-C24 arylsulfanyl, C1-C20 alkylsulfinyl, NO₃, —N═C═O, —N═C═S, or C₅-C₂₄ arylsulfinyl. Optionally, $X^1$ and $X^2$ may be substituted with one or more moieties selected from C1-C12 alkyl, C1-C12 alkoxy, C5-C24 aryl, and halide, which may, in turn, with the exception of halide, be further substituted with one or more groups selected from halide, C1-C6 alkyl, C1-C6 alkoxy, and phenyl. In some embodiments, $X^1$ and $X^2$ are halide, benzoate, C2-C6 acyl, $C_2$-$C_6$ alkoxycarbonyl, C1-C6 alkyl, phenoxy, C1-C6 alkoxy, C1-C6 alkylsulfanyl, aryl, or $C_1$-$C_6$ alkylsulfonyl. In some preferred embodiments, $X^1$ and $X^2$ are each halide, CF₃CO₂, CH₃CO₂, CFH₂CO₂, (CH₃)₃CO, (CF₃)₂(CH₃)CO, (CF₃)(CH₃)₂CO, PhO, MeO, EtO, tosylate, mesylate, or trifluoromethane-sulfonate. In some preferred embodiments, $X^1$ and $X^2$ are each chloride.

$R^1$ and $R^2$ are independently selected from hydrogen, hydrocarbyl (e.g., C1-C20 alkyl, C2-C20 alkenyl, C2-C20 alkynyl, C5-C24 aryl, C6-C24 alkaryl, C6-C24 aralkyl, etc.), substituted hydrocarbyl (e.g., substituted C1-C20 alkyl, C2-C20 alkenyl, C2-C20 alkynyl, C5-C24 aryl, C6-C24 alkaryl, C6-C24 aralkyl, etc.), heteroatom-containing hydrocarbyl (e.g., heteroatom-containing C1-C20 alkyl, C2-C20 alkenyl, C2-C20 alkynyl, C5-C24 aryl, C6-C24 alkaryl, C6-C24 aralkyl, etc.), and substituted heteroatom-containing hydrocarbyl (e.g., substituted heteroatom-containing C1-C20 alkyl, C2-C20 alkenyl, C2-C20 alkynyl, C5-C24 aryl, C6-C24 alkaryl, C6-C24 aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In some embodiments, $R^1$ is C1-C6 alkyl, C2-C6 alkenyl, and C5-C14 aryl.

In some embodiments, $R^2$ is phenyl, vinyl, methyl, isopropyl, or t-butyl, optionally substituted with one or more moieties selected from C1-C6 alkyl, C1-C6 alkoxy, phenyl, and a functional group Fn. Suitable functional groups ("Fn") include phosphonato, phosphoryl, phosphanyl, phosphino, sulfonato, C1-C20 alkylsulfanyl, C5-C20 arylsulfanyl, C1-C20 alkylsulfonyl, C5-C20 arylsulfonyl, C1-C20 alkylsulfinyl, C5-C20 arylsulfinyl, sulfonamido, amino, amido, imino, nitro, nitroso, hydroxyl, C1-C20 alkoxy, C5-C20 aryloxy, C2-C20 alkoxycarbonyl, C5-C20 aryloxycarbonyl, carboxyl, carboxylato, mercapto, formyl, C1-C20 thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge).

In some embodiments, $R^2$ is phenyl or vinyl substituted with one or more moieties selected from methyl, ethyl, chloro, bromo, iodo, fluoro, nitro, dimethylamino, methyl, methoxy, and phenyl. In some favored embodiments, $R^2$ is phenyl or —CH═C(CH₃)₂.

In some embodiments, one or both of $R^1$ and $R^2$ may have the structure -(W)$_n$-U⁺V⁻, wherein W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1.

Furthermore, $R^1$ and $R^2$ may be taken together to form an indenylidene moiety, such as phenylindenylidene.

In some embodiments, any one or more of $X^1$, $X^2$, $L^1$, $L^2$, $L^3$, $R^1$ and $R^2$ may be attached to a support or two or more (e.g. three or four) of said groups can be bonded to one another to form one or more cyclic groups, including bidentate or multidentate ligands, as disclosed, for example, in U.S. Pat. No. 5,312,940, incorporated herein by reference. When two or more of $X^1$, $X^2$, $L^1$, $L^2$, $L^3$ $R^1$ and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

Other metal carbene olefin metathesis catalysts, commonly referred to as Second or Third Generation Grubbs-type catalysts, have the structure of Catalyst Formula (I), wherein $L^1$ is a carbene ligand having the structure of formula (II)

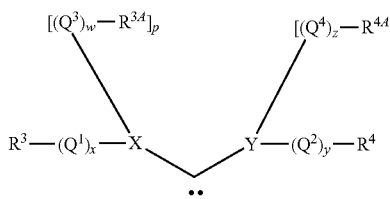

wherein M, m, n, $X^1$, $X^2$, $L^2$, $L^3$, $R^1$ and $R^2$ are as previously defined Formula I;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents of adjacent atoms within $Q^1$, $Q^2$, $Q^3$, and $Q^4$ may be linked to form an additional cyclic group;

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety, preferably phenylindenylidene. Moreover, $X^1$, $X^2$, $L^2$, $L^3$, X and Y may be further coordinated to boron or to a carboxylate;

Any two or more of $X^1$, $X^2$, $L^1$, $L^2$, $L^3$, $R^1$, $R^2R^3$, $R^{3A}$, $R^4$, $R^{4A}$, $Q^1$, $Q^2$, $Q^3$, and $Q^4$ can be bonded to one another to form one or more cyclic groups or can also be taken to be -A-Fn, wherein "A" is a divalent hydrocarbon moiety and Fn is a functional group as previously described. Further, with the exception of $L^1$ such groups may be bonded to a support.

A particular class of such carbene are commonly referred to as N-heterocyclic carbene (NHC) ligands.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

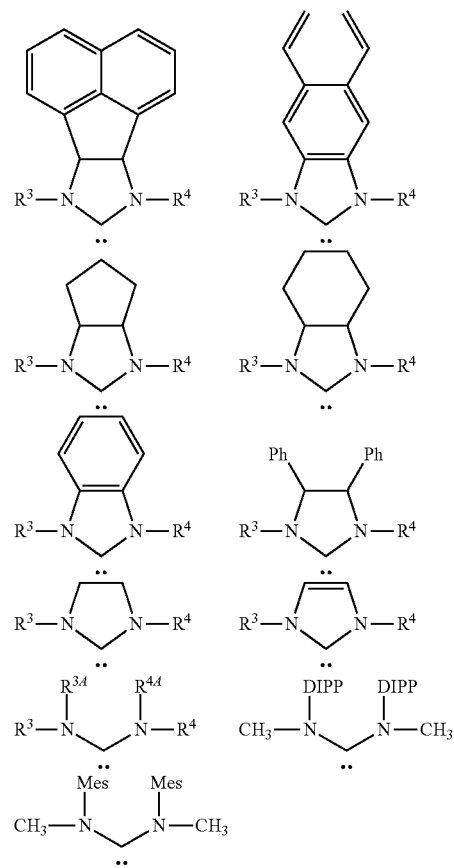

Representative metal carbene olefin metathesis catalysts include for example bis(tricyclohexylphosphine)benzylidene ruthenium dichloride, bis(tricyclohexylphosphine) dimethylvinylmethylidene ruthenium dichloride, bis(tricyclopentylphosphine)dimethylvinylmethylidene ruthenium dichloride, (tricyclohexylphosphine)(1,3-dimesityl-4,5-dihydroimidazol-2-ylidene)benzylidene ruthenium dichloride, (tricyclopentylphosphine)(1,3-dimesityl-4,5-dihydroimidazol-2-ylidene)dimethylvinylmethylidene ruthenium dichloride, (tricyclohexylphosphine)(1,3-dimesityl-4,5-dihydroimidazol-2-ylidene)dimethylvinylmethylidene ruthenium dichloride, (tricyclohexylphosphine)(1,3-dimesitylimidazol-2-ylidene)benzylidene ruthenium dichloride, (tricyclopentylphosphine)(1,3-dimesitylimidazol-2-ylidene)dimethylvinylmethylidene ruthenium dichloride, and (tricyclohexylphosphine)(1,3-dimesitylimidazol-2-ylidene) dimethylvinylmethylidene ruthenium dichloride.

Numerous metal carbene olefin metathesis catalysts are known, such as described in previously cited U.S. Pat. No. 10,239,965.

In some embodiments, the adhesive compositions described herein are two-part compositions wherein the catalyst is separated from the cyclic olefin until the time of use. In this embodiment, any suitable ring opening metathesis polymerization catalyst can be utilized.

In other embodiments, the adhesive composition of the tape and one-part adhesive composition comprise a latent ring opening metathesis polymerization catalyst. Latent ring opening metathesis polymerization catalysts exhibit little or no catalytic activity (e.g. polymerization of the cyclic olefin) for at least 24 hours room temperature. With reference to the forthcoming exemplified adhesive compositions and articles, the catalyst or precatalyst thereof is sufficiently latent such that the adhesive composition exhibits an overlap shear value with aluminum of less than 30 kPa after at least 24 hours at 25° C. The adhesive or adhesive coated article can be stored at cold temperatures to prevent premature activation of thermally activated catalysts. Likewise, the adhesive or adhesive coated article can be stored in a dark box or dark packaging materials to prevent premature activation of light activated catalysts.

Latent ring opening metathesis polymerization catalysts can be triggered or in other words activated with heat (i.e. thermal activation), actinic (e.g. ultraviolet) radiation, a chemical compound, or a combination thereof. In some embodiments, the latent ring opening polymerization catalysts are activated by a combination of actinic (e.g. ultraviolet) radiation and an acid compound. In some embodiments, a modified First or Second Generation Grubbs' catalyst as previously described can function as a latent catalyst. One representative latent catalyst is depicted as follows:

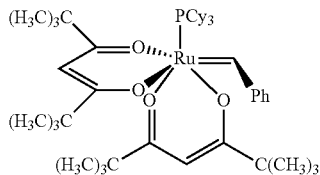

Such catalyst can be activated with an acid, such as a photoacid generator ("PAG"), as depicted in the following reactive scheme:

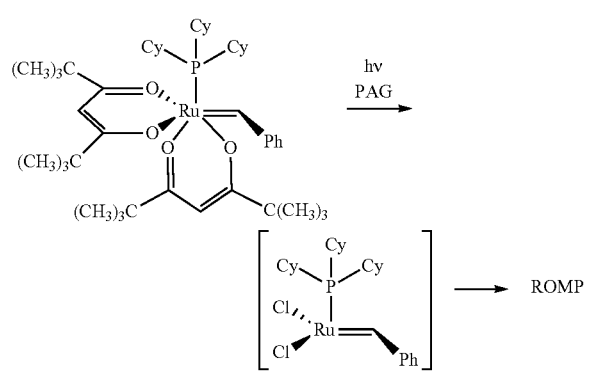

Another class of latent catalysts comprise a carbyne, i.e. a (e.g. Ru) metal carbon triple bond (also described in the literature as (e.g. Ru) metal carbides). These catalysts can be characterized as a ring opening metathesis polymerization precatalyst because such catalysts form a ring opening metathesis polymerization catalyst when reacted with an acid, such as a photoacid generator, as depicted in the following representative reactive scheme:

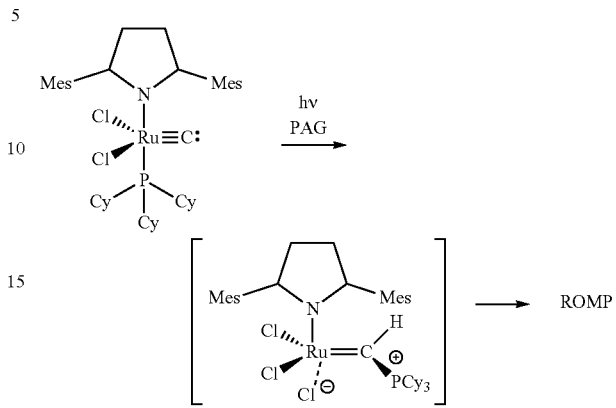

Such ring opening metathesis polymerization precatalysts can have the general formula:

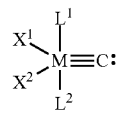

wherein $L^1$ is a carbene ligand having the structure of formula (II)

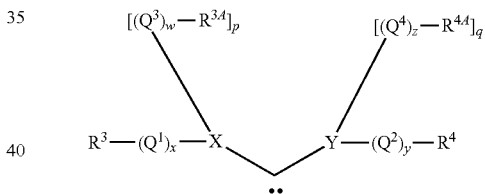

wherein M, $X^1$, $X^2$, and $L^2$ are as previously defined for Formula I. In some embodiments, $X^1$ and $X^2$ are chlorine. In some embodiments, $L^2$ is $PCy_3$.

In other embodiments, the latent catalyst can be activated by actinic (e.g. UV) energy in the absence of an acid compound. One class of compounds may be characterized as Fischer-type ruthenium carbene catalysts, such as described in WO2018/045132; incorporated herein by reference. Such catalysts have the following formula or a geometric isomer thereof

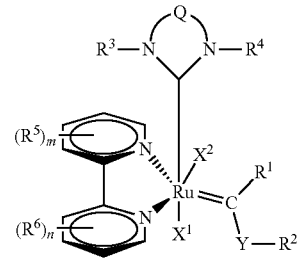

wherein $X^1$ and $X^2$ are independently anionic ligands;

Y is O, N—$R^1$, or S; and

Q is a two-atom linkage having the structure —$CR^{11}$—$R^{12}$—$CR^{13}R^{14}$— or —$C^{11}$=$CR^{13}$—; wherein, $R^{11}$, $R^{12}$, $R^{13}$, and $R^{14}$ are independently hydrogen, hydrocarbyl, or a substituted hydrocarbyl;

$R^1$ and $R^2$ independently hydrogen, (optionally substituted) hydrocarbyl, or may be linked together to form an (optionally substituted) cyclic aliphatic group;

$R^3$ and $R^4$ are independently (optionally substituted) hydrocarbyl, and $R^5R^6$ are independently H, C1-24 alkyl, C1-24 alkoxy, C1-24 fluoroalkyl, C1-24 fluoroalkoxy, C1-24 alkylhydroxy, C1-24 alkoxyhydroxy, C1-24 fluoroalkylhydroxy(including perfluoroalkylhydroxy), C1-24 fluoroalkoxyhydroxy, halo, cyano, nitro, or hydroxy; and m and n are independently 1, 2, 3, or 4.

In some embodiments, the moiety

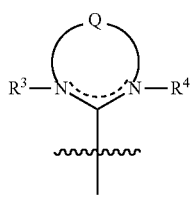

is a N-heterocyclic carbene (NHC) ligand as described above. Other N-heterocyclic carbene (NHC) ligands include:

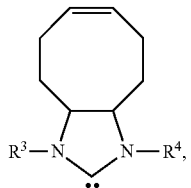

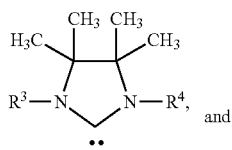
and

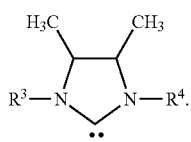

In one embodiment, the metathesis catalyst comprises a compound having the structure:

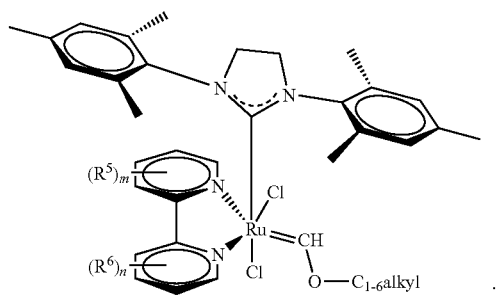

Actinic radiation activated catalyst can be preferred for bonding heat sensitive substrates comprised of organic polymeric materials. However, for bonding other substrates, the latent catalysts may be heat activated. In typical embodiments, the heat activation temperature is well above room temperature. For example, the heat activation temperature is at least 50, 60, 70, 80, 90 or 100° C. The heat activation temperature may range up to 130, 140, or 150° C. In one embodiment, thermally latent catalysts includes isomers that are inactive at room temperature yet active at temperatures ranging from 50° C. to 90° C. One representative catalyst is as follows:

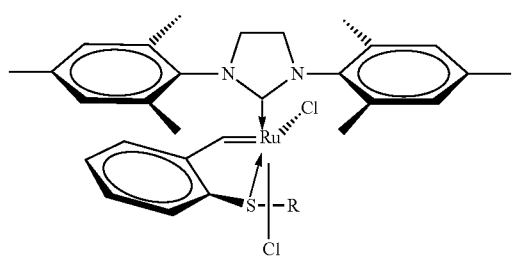

Another class of heat activatable catalyst comprises chelating alkylidene ligands. Some representative catalysts include:

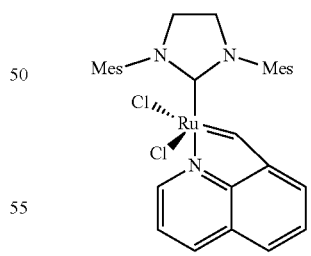

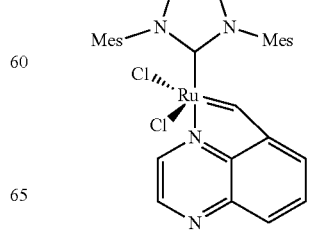

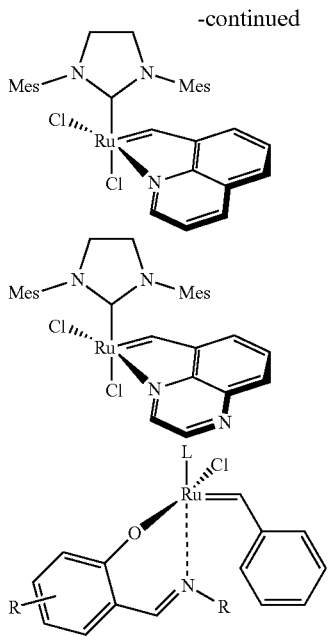

The composition typically comprises the metathesis catalyst in an amount ranging from about 0.0001 wt. % to 2 wt. % catalyst based on the total weight of the composition. In some embodiments, the composition typically comprises at least 0.0005, 0.001, 0.005, 0.01, 0.05, 0.10, 0.15 or 0.20 wt. % catalyst. In some embodiments, the composition typically comprises no greater than 1:5, 1, or 0.5 wt. % catalyst.

In some embodiments, the activation of the latent olefin metathesis catalyst is achieved by the addition of acid, photoacid generator ("PAG"), or thermal acid generator ("TAG") and exposing the composition to (e.g. ultraviolet) actinic radiation. When present, the acid, photoacid or thermal acid generator is typically present in the adhesive composition in an amount of at least 0.005 or 0.01 wt. % and typically no greater than 10 wt. % of the composition. In some embodiments, the concentration is no greater than 5, 4, 3, 2, 1, or 0.5 wt. % of the adhesive composition. Alternatively the acid, photoacid generator ("PAG"), or thermal acid generator ("TAG") can be applied to the substrate the adhesive is applied to.

Upon irradiation with light energy, ionic photoacid generators undergo a fragmentation reaction and release one or more molecules of Lewis or Brönsted acid that activate the olefin metathesis catalyst. Useful photoacid generators are thermally stable and do not undergo thermally induced reactions with the copolymer and are readily dissolved or dispersed in the composition. Typical photoacid generators are those in which the incipient acid has a pKa value of ≤0. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4$^{th}$ Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se- N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diaryalkylsulfonium, dialkylarylsulfonium, and trialkylsulfonium wherein "aryl" and "alkyl" are as defined and having up to four independently selected substituents. The substituents on the aryl or alkyl moieties will preferably have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsufonium).

Useful onium salts photoacid generator include diazonium salts, such as aryl diazonium salts; halonium salts, such as diarlyiodonium salts; sulfonium salts, such as triarylsulfonium salts, such as triphenyl sulfonium triflate; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Ionic photoacid generators include, for example, bis(4-t-butylphenyl) iodonium hexafluoroantimonate (FP5034™ from Hampford Research Inc., Stratford, CT), a mixture of triarylsulfonium salts (diphenyl(4-phenylthio)phenylsulfonium hexafluoroantimonate, bis(4-(diphenylsulfonio)phenyl)sulfide hexafluoroantimonate) available as Syna PI-6976™ from Synasia, Metuchen, NJ, (4-methoxyphenyl) phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy) phenyl]phenyliodonium hexafluoroantimonate), (4-isopropylphenyl)(4-methylphenyl)iodonium tetrakis (pentafluorophenyl) borate (available as Rhodorsil 2074™ from Bluestar Silicones, East Brunswick, NJ), bis(4-methylphenyl) iodonium hexafluorophosphate (available as Omnicat 440™ from IGM Resins, Bartlett, IL), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsulfonium hexafluorophosphate, bis(4-(diphenylsulfonio)phenyl)sulfide bis(hexafluorophosphate), diphenyl(4-phenylthio)phenylsulfonium hexafluoroantimonate, bis(4-(diphenylsulfonio)phenyl)sulfide hexafluoroantimonate, and blends of these triarylsulfonium salts available from Synasia, Metuchen, NJ under the trade designations of Syna PI-6992™ and Syna PI-6976™ for the $PF_6$ and $SbF_6$ salts, respectively.

In one embodiment, the photoacid generator is a triazine compound having the formula.

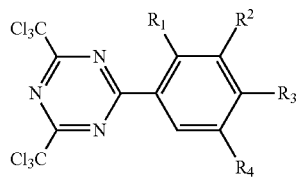

wherein $R_1$, $R^2$, $R^3$ and $R^4$ of this triazine crosslinking agent are independently hydrogen or alkoxy group, and 1 to 3 of $R_1$, $R^2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine compounds are further described in U.S. Pat. No. 4,330,590.

Optionally, the composition may include photosensitizers or photoaccelerators with the photoacid generators. Use of photosensitizers or photoaccelerators alters the wavelength sensitivity of radiation-sensitive compositions employing the latent catalysts and photoacid generators of this invention. This is particularly advantageous when the photoacid generator does not strongly absorb the incident radiation. Use of photosensitizers or photoaccelerators increases the radiation sensitivity, allowing shorter exposure times and/or use of less powerful sources of radiation.

Upon exposure to thermal energy, TAGs undergo a fragmentation reaction and release one or more molecules of Lewis or Bronsted acid. Useful TAGs are thermally stable up to the activation temperature. Preferred TAGs are those in which the incipient acid has a $pK_a$ value of less than or equal to 0. Useful thermal acid generators have an activation temperature of 150° C. or less, preferably 140° C. or less. As used herein, "activation temperature" is that temperature at which the thermal release of the incipient acid by the TAG in the adhesive formulation occurs. Typically, the TAG will have an activation temperature in a range from about 50° C. to about 150° C.

Useful classes of TAGs can include, for example, alkylammonium salts of sulfonic acids, such as triethylammonium p-toluenesulfonate (TEAPTS). Another suitable class of TAGs is that disclosed in U.S. Pat. No. 6,627,384 (Kim, et al.); incorporated herein by reference, which describes cyclic alcohols with adjacent sulfonate leaving groups. Suitable classes of thermal acid generators also include those described in U.S. Pat. No. 7,514,202 (Ohsawa et al.) and 5,976,690 (Williams et al.); incorporated herein by reference.

Suitable ROMP catalysts or precatalysts can polymerize the cyclic olefin via thermal curing, exposure to actinic (e.g. UV) radiation, or a combination thereof.

The composition may optionally further comprise a rate modifier such as, for example, triphenylphosphine (TPP), tricyclopentylphosphine, tricyclohexylphosphine, triisopropylphosphine, trialkylphosphites, triarylphosphites, mixed phosphites, pyridine, or other Lewis base. The rate modifier may be added to the cyclic olefin component to retard or accelerate the rate of polymerization as required. The amount of rate modifier can be the same amounts just described for the catalyst. Typically, the amount of rate modifier is less than 0.01 or 0.005 wt. % based on the total amount of cyclic olefin.

The adhesive composition further comprises a polymer.

The amount of polymer is typically at least 20, 25, 30, 35, 40, 45, or 50 wt. % of the sum of cyclic olefin(s) and polymer. In some embodiments, the amount of polymer is at least 55, 60, 65, 70, 75, or 80 wt. % of the sum of cyclic olefin(s) and polymer. In some embodiments, the amount of polymer is no greater than 80, 75, 70, 65, 60, 55, or 50 wt. % of the sum of cyclic olefin(s) and polymer.

In some embodiments, the (e.g. pressure sensitive adhesive) polymer has a glass transition temperature below 25° C. as determined by Dynamic Mechanical Analysis (according to the test method described in the examples.) The Tg of polymer or copolymer can be estimated by use of the Fox equation, based on the Tgs of a homopolymer of the constituent monomers and the weight percent thereof.

Higher concentrations of low Tg (e.g. pressure sensitive adhesive) polymer can be amendable to providing higher initial adhesion to a substrate prior to polymerizing the cyclic olefin. However, higher concentrations of cyclic olefin(s) are amenable to higher structural bond strength as evident by high overlap shear values.

In some embodiments, the polymer together with unpolymerized cyclic olefin is substantially solid such that an adhesive article, such as tape, can be formed from the composition.

In some embodiments, the polymer is a (meth)acrylic polymer comprising polymerized units derived from one or more (meth)acrylate ester monomers derived from a (e.g. non-tertiary) alcohol containing from 1 to 14 carbon atoms and preferably an average of from 4 to 12 carbon atoms. The (meth)acrylic polymer and/or PSA composition may also comprise one or more monomers (e.g. common to acrylic polymers and adhesives) such as a (meth)acrylic ester monomers (also referred to as (meth)acrylate acid ester monomers and alkyl(meth)acrylate monomers) optionally in combination with one or more other monomers such as acid-functional ethylenically unsaturated monomers, non-acid-functional polar monomers, and vinyl monomers.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isoctylalcohol, 2-ethyl-1-hexanol, 1-decanol, 2-propyl-heptanol, 1-dodecanol, 1-tridecanol, 1-tetradecanol, and the like. In some embodiments, a preferred (meth)acrylate ester monomer is the ester of (meth)acrylic acid with isooctyl alcohol.

The (meth)acrylic polymer comprises one or more low Tg monomers, having a Tg no greater than 10° C. when the monomer is polymerized (i.e. independently) to form a homopolymer. In some embodiments, the low Tg monomers have a Tg no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The Tg of these homopolymers can be, for example, in the range of −80° C. to 20° C., −70° C. to 10° C., −60° C. to 0° C., or −60° C. to −10° C.

The low Tg monomer may have the formula

wherein $R_1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, for example, 2-methoxyethyl acrylate and 2-ethoxyethyl acrylate.

In some embodiments, the (meth)acrylic) polymer comprises at least one low Tg monomer having a non-cyclic alkyl (meth)acrylate monomer(s) having 4 to 20 carbon atoms. In some embodiments, the (meth)acrylic polymer and/or PSA comprises at least one low Tg monomer having a (e.g. branched) alkyl group with 6 to 20 carbon atoms. In some embodiments, the low Tg monomer has a (e.g. branched) alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl(meth)acrylate, and lauryl (meth)acrylate.

In some embodiments, the (meth)acrylic polymer comprises a high Tg monomer, having a Tg greater than 10° C. and typically of at least 15° C., 20° C. or 25° C., and preferably at least 50° C.

Suitable high Tg alkyl (meth)acrylate monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate (110° C., according to Aldrich), norbornyl(meth)acrylate, benzyl methacrylate, 3,3,5 trimethylcyclohexyl acrylate, cyclohexyl acrylate, N-octyl acrylamide, and propyl methacrylate or combinations.

Polymerized alkyl (meth)acrylate monomers are typically present in the (meth)acrylic polymer in an amount of at least 50, 55, 60, 65, or 75 wt. % of the meth)acrylic polymer.

In some embodiments, the (meth)acrylic polymer comprises at least 50, 55, 60, 65, 70, 75, 80, 85, 90 or 95 wt. % or greater of polymerized units of low Tg (e.g. alkyl) (meth)acrylate monomer(s). When high Tg monomers are present, the amount may be at least 5, 10, 15, or 20, ranging up to 30 wt. % of the polymerized units of the meth)acrylic polymer.

The (meth)acrylic polymer may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomers may be present in an amount of 0 or at least 0.5 and no greater than 5, 10 or 15 wt. % based on the total weight of polymerized units of the (meth)acrylic polymer. In some embodiments, such as when the catalyst is activatable with acid, the (meth)acrylic polymer of a one-part adhesive composition or adhesive article may comprise little or no polymerized acid functional monomers. In this embodiments, the amount of polymerized acid functional monomers is typically no greater than 5, 4, 3, 2, 1, 0.5, or 0.1 wt. % of the (meth)acrylic polymer.

The (meth)acrylic polymer and/or PSA composition may optionally comprise other monomers such as a non-acid-functional polar monomer.

Representative examples of suitable polar monomers include but are not limited to 2-hydroxyethyl (meth)acrylate; tetrahydrofurfuryl acrylate N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. In some embodiments, the (meth)acrylic polymer comprises hydroxyl, ether, or amide group. The non-acid-functional polar monomer may be present in an amount of zero or at least 0.5, 1, 2, 3, 5, 6, 7, 8, 9, or 10 wt. % ranging up to 15 or 20 wt. % of polymerized units of the (meth)acrylic polymer.

When the (meth)acrylic polymer comprises polymerized units of acid functional monomers or non-acid functional polar monomers, the (meth)acrylic polymer can function as an adhesion promoter.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Vinyl monomers may be present in an amount of 0 or at least 0.5 or 1 wt. % ranging up 5 wt. %, based on the total polymerized units of the (meth)acrylic polymer.

The (meth)acrylic polymer and/or composition may optionally comprise a crosslinker. When utilized, the amount of crosslinker is typically present in an amount of at least 0.05, 0.10, 0.15, 0.20 up to 1, 2, 3, 4, or 5 parts by weight, relative to 100 parts by weight of the composition.

In some embodiments, the (meth)acrylic polymer and/or composition comprises a multifunctional (meth)acrylate crosslinking monomer. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth) acrylate, and mixtures thereof.

In other embodiments, (meth)acrylic polymer and/or composition comprises a chlorinated triazine crosslinking compound. The previously described chlorinated triazine compounds can be utilized as photoacid generators and crosslinking compounds.

The (meth)acrylic copolymers can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

One method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth)acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface. Polymerization of the (meth)acrylic is typically conducted in the absence of water or organic solvents such as ethyl acetate, toluene and tetrahydrofuran, which are non-reactive with the comonomers of the (meth)acrylic polymer.

Polymerization of the (meth)acrylate solvent monomers can be accomplished by exposing the syrup composition to (e.g. UV) energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the syrup.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACUREKB-1 photoinitiator (Sartomer Co., West Chester, PA), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.

Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 part by weight, relative to 100 parts by weight of the total syrup content.

The composition optionally further comprises an adhesion promoter.

In some embodiments, the adhesion promoter is a compound or polymer containing at least two isocyanate groups. The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In some embodiments, the adhesion promoter is a diisocyanate compound, or mixtures of diisocyanate compounds.

In some embodiments, the adhesion promoters are polymeric polyisocyanates (e.g. diisocyanate) such as polyisocyanate prepolymers available from Convestro including the trade designations DESMODUR E-28 (MDI based) and Baytec ME-230 (modified MDI based on polytetramethylene ether glycol (PTMEG). Such polymeric polyisocyanates (e.g. diisocyanates) comprise C2-C4 alkylene oxide repeat units. Further, such polymeric polyisocyanates typically have an average equivalent weight ranging from 200-5000 g/mole per isocyanate group.

In some embodiments, the polymeric isocyanate adhesion promoter is typically the reaction product of a polyol and aliphatic diisocyanate such as MDI. The polyol typically has one or more oxygen atoms in the backbone such as in the case of polytetramethylene ether glycol and polypropylene oxide.

In some embodiments, the (e.g. polytetramethylene ether glycol) polyol has a molecular weight of about 90 g/mol. Such polymeric isocyanate may have a NCO content of greater than 15, 16, 17, 18, 19, or 20 wt. %. The NCO content is typically no greater than 25 wt. %.

In some embodiments, the (e.g. polypropylene oxide) polyol has a molecular weight of at least 1000, 1100, 1200, 1300, 1400, 1500, 1600, 1700, 1800, 1900, or 2000 g/mol. The amount of polymerized polyol is typically less than 55, 50, 45, or 40 wt. % of the polymeric isocyanate. Such polymeric isocyanate may have a NCO content of greater than 10, 11, 12, 13, 14, or 15 wt. %. The NCO content is typically no greater than 20 wt. %. The equivalent weight of the polymeric polyol can be less than 400, 350, or 300 g/mole/NCO group. The equivalent weight is typically at least 150, 200 or 250 g/mole/NCO group.

In some embodiments, the composition may comprise a maleic anhydride grafted polymer as an adhesion promoter such as available under the trade designation "POLYVEST MA 75" from Evonik, Essen, Germany and under the trade designation "RICON 131 Maleinized Polybutadiene 131MA10" from Cray Valley, Exton, PA. In this embodiment, the polymers may be characterized as polyolefins. The polyolefins may be unsaturated, comprising alkene moieties, such as polybutadiene. Unlike styrenic block copolymers, the olefin polymers lack polystyrene blocks.

In some embodiments, the polyolefin adhesion promoters have an average anhydride equivalent weight ranging from 200-5000 g/mole per anhydride group. In some embodiments, the average anhydride equivalent weight ranging is no greater than 4000, 3000, 2000, 1000 or g/mole per anhydride group.

The (e.g. polymeric polyisocyanate or olefin polymer comprising maleic anhydride moieties) adhesion promoter is a liquid, typically having a viscosity at 20 or 25° C. of at least 2000, 3000, 4000, or 5000 mPas. (DIN EN ISO 3219). In some embodiments, the viscosity at 20 or 25° C. is no greater than 75,000 mPas. In some embodiments, the viscosity is no greater than 15,000 or 10,000 mPas. In some embodiments, the viscosity is less than 1000 or 500 mPas. In other embodiments, the adhesion promoter may have a viscosity of at least 50,000; 75,000; 100,000; 125,000 or 150,000 mPas at 45, 50, or 55° C. The viscosity is indicative of the molecular weight. Liquid adhesion promoters can be combined with the liquid unpolymerized cyclic olefin more easily than solids, resulting in the adhesion promoter being more uniformly dispersed within the mixture.

The adhesion promoter is polymeric i.e. having a backbone with (e.g. polyether or polyolefin) repeat units. In typical embodiments, the polymeric adhesion promoter has a molecular weight (Mn) of no greater than 10,000; 9,000; 8,000; 7,000; or 6,000 g/mole. In some embodiments, the polymeric adhesion promoter has a molecular weight (Mn) has a molecular weight of at least 1000, 1100, 1200, 1300, 1400, 1500, 1600, 1700, 1800, 1900, or 2000 g/mole.

Various other adhesion promoters can be used alone or in combination with the polymeric adhesion promoters just described.

In some embodiments, the adhesion promoter is an aliphatic diisocyanate. Aliphatic diisocyanates comprise a linear, branched, or cyclic saturated or unsaturated hydrocarbon group typically containing 1 to about 24 carbon atoms. In some embodiments, the alkyl diisocyanate contains at least 2, 3, 4, 5, or 6 carbon atoms. In some embodiments, the aliphatic diisocyanate contains no greater than 22, 20, 18, 16, 14, or 12 carbon atoms. Representative examples include hexamethylene diisocyanate (HDI), octamethylene diisocyanate, decamethylene diisocyanate, and the like. In some embodiments, the aliphatic diisocyanate comprises a cycloaliphatic (e.g. cyclcoalkyl) moiety, typically having 4 to 16 carbon atoms, such as cyclohexyl, cyclooctyl, cyclodecyl, and the like. In one embodiments, the cycloalkyl diisocyanate is isophorone diisocyanate (IPDI) and the isomers of isocyanato-[(isocyanatocyclohexyl)methyl]cyclohexane ($H_{12}MDI$).

In some embodiments, the adhesion promoter is an aromatic diisocyanate. Aromatic diisocyanates include one or more aromatic rings that are fused together or covalently bonded with an organic linking group such as an alkylene (e.g. methylene or ethylene) moiety. Representative aromatic moieties include phenyl, tolyl, xylyl, napthyl, biphenyl, diphenylether, benzophenone, and the like. Suitable aromatic diisocyanates contain 6 to 24 carbon atoms, such as toluene diisocyanates, xylene diisocyanate, xylylene diisocyanate, tetramethylxylylene diisocyanate (TMXDI), and methylene diphenyl diisocyanate (MDI), that may comprise any mixture of its three isomers, 2.2'-MDI, 2,4'-MDI, and 4,4'-MDI.

Other polymeric isocyanates include for example PM200 (poly MDI), Lupranate™ (poly MDI from BASF), various isocyanate terminated polybutadiene prepolymers available from Cray Valley including Krasol™ LBD2000 (TDI based), Krasol™ LBD3000 (TDI based), Krasol™ NN-22 (MDI based), Krasol™ NN-23 (MDI based), and Krasol™ NN-25 (MDI based).

In some embodiments, the adhesion promoter is a maleic-anhydride grafted styrene-ethylene/butylene-styrene hydrogenated copolymer, typically comprising at least 0.1, 0.2, 0.3, 0.4 or 0.5 wt. % of grafted maleic anhydride. The amount of grafted maleic anhydride is typically no greater than 7, 6, 5, 4, 3, or 2 wt. %. Maleic-anhydride grafted styrene-ethylene/butylene-styrene hydrogenated copolymers typically comprise at least 10 and no greater than 60, 50, or 40% polystyrene. Suitable functional elastomers are commercially available from Kraton Performance Polymers as the trade designations "Kraton FG1901G" and "Kraton FG1924G". The amount of (e.g. functional) elastomer when present in typically at least 0.001, 0.05, or 0.1 wt. % based on the weight of the cyclic olefin.

The composition typically comprises at least 0.005, 0.010, 0.050, 0.10, 0.50, or 1 wt. % of adhesion promoter based on the total weight of the composition. In some embodiments, the amount of adhesion promoter is no greater than 10, 9, 8, 7, 6, 5, 4, 3, 2, or 1 wt. % of the total weight of the composition. In some embodiments, the adhesion promoter comprises one or more polymeric polyisocyanate (e.g. diisocyanate) comprising oxygen atoms in the backbone. In some embodiments, the adhesion promoter comprises one or more polyolefins comprising maleic anhydride moieties. In some embodiments, the adhesion promoter comprises at least one polymeric polyisocyanate (e.g. diisocyanate) comprising oxygen atoms in the backbone and at least one polyolefin comprising maleic anhydride moieties. When two adhesion promoters are used, the amount of each adhesion promoter is typically less than 5, 4, 3, 2, or 1 wt. % of the total weight of the composition.

The adhesive compositions may optionally contain one or more conventional additives. Preferred additives include tackifiers, plasticizers, antioxidants, UV stabilizers, colorants and (e.g. inorganic) fillers such as (e.g. fumed) silica and glass bubbles. In some embodiments, little or no tackifier is used (i.e. less than 5, 4, 3, 2, or 1 wt. %. When tackifiers are used, the concentration can range from 5 or 10 up to 15 or 20 wt. % or greater of the (e.g. cured) adhesive composition.

The cyclic olefin, polymer, and other components can be combined in various methods. In some embodiments, the materials are combined in an organic solvent such as toluene and ethyl acetate. In other embodiment, the cyclic olefin can be combined with the partially polymerized (meth)acrylic syrup described above.

The adhesive composition can be coated on a substrate (e.g. release liner or backing) using conventional coating techniques. For example, these compositions can be applied to a variety of substrates by methods such as roller coating, flow coating, dip coating, spin coating, spray coating knife coating, and die coating. Coating (dry) thickness typically ranges from 25 (e.g. about 1 mil) to 1500 microns (60 mils). In some embodiments, the coating thickness ranges from about 50 to 350 microns.

The method of applying and polymerizing the cyclic olefin of the composition will vary depending on the desired use of the composition. In favored embodiments, polymerization occurs after applying the adhesive article or adhesive composition to a substrate. However, in alternative embodiments polymerization of the composition (at least in part) may occurs prior to applying the composition to a substrate or concurrently with application to a substrate.

The adhesive composition may be coated upon a variety of flexible (e.g. tape backing materials) and inflexible substrates. Examples include for example plastic films such as polyolefins (e.g. polypropylene, polyethylene), polyvinyl chloride, polyester (polyethylene terephthalate), polycarbonate, polymethyl(meth)acrylate (PMMA), cellulose acetate, cellulose triacetate, and ethyl cellulose. In some embodiments, the backing is comprised of a bio-based material such as polylactic acid (PLA).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these.

The backing may also be formed of metal, metalized polymer films, ceramic sheet materials, or foam (e.g., polyacrylic, polyethylene, polyurethane, neoprene), and the like.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing.

When the cyclic olefin is polymerized with a ROMP catalyst activated by exposure to actinic (e.g. UV) radiation, the adhesive composition (e.g. of the adhesive article) may be irradiated with activating UV radiation having a UVA maximum at a wavelength range of 280 to 425 nanometers. UV light sources can be of various types. Low light intensity sources, such as blacklights, generally provide intensities ranging from 0.1 or 0.5 mW/cm$^2$ (milliwatts per square centimeter) to 10 mW/cm$^2$ (as measured in accordance with procedures approved by the United States National Institute of Standards and Technology as, for example, with a UVI-MAP UM 365 L-S radiometer manufactured by Electronic Instrumentation & Technology, Inc., in Sterling, VA). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the cyclic olefin(s) can be provided by various light sources such as light emitting diodes (LEDs), blacklights, medium pressure mercury lamps, etc. or a combination thereof. The cyclic olefin(s) can also be polymerized with higher intensity light sources as available from Fusion UV Systems Inc. The UV exposure time for polymerization and curing can vary depending on the intensity of the light source(s) used. For example, complete curing with a low intensity light source can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

Alternatively or in combination thereof, when the cyclic olefin is polymerized with a thermally activated ROMP catalyst, the adhesive is heated as previously described.

Due to the inclusion of a sufficient amount of low Tg (e.g. alkyl (meth)acrylate) monomer the (meth)acrylic polymer and compositions described herein have a glass transition temperature "Tg" of no greater than 25° C. prior to polymerizing the cyclic olefin. As used herein, Tg refers to the value obtained utilizing Dynamic Mechanical Analysis according to the test method described in the examples. In some embodiments, the (meth)acrylic polymer and compositions have a Tg no greater than 20° C., 15° C., 10° C., 5° C., 0° C., −5° C., −10° C., −15°, −20° C., or −25° C. prior to polymerizing the cyclic olefin.

In typical embodiments, the composition is a pressure sensitive adhesive prior to polymerizing the cyclic olefin. In this embodiment, the storage modulus (G') of the pressure sensitive adhesive at (e.g. 25° C.) is less than 3×10$^5$ Pa at a frequency of 1 Hz. As used herein, storage modulus (G') refers to the value obtained utilizing Dynamic Mechanical Analysis according to the test method described in the examples. In some embodiments, the pressure sensitive adhesive composition has a storage modulus of less than 2×10$^5$ Pa, 1×10$^5$ Pa, 9×10$^4$ Pa, 8×10$^4$ Pa, 7×10$^4$ Pa, 6×10$^4$ Pa, 5×10$^4$ Pa, 4×10$^4$ Pa, or 3×10$^4$ Pa, prior to polymerizing the cyclic olefin.

In some embodiments, such as when the composition comprises a high concentration of a pressure sensitive adhesive polymer in combination with a low concentration of cyclic olefin, the adhesive is a pressure sensitive adhesive after polymerizing the cyclic olefin. In this embodiment, the storage modulus (G') of the pressure sensitive adhesive increases by inclusion of the polymerized cyclic olefin. In one embodiment, the adhesive composition increases from about $10^4$ to $10^5$ or in other words increases in storage modulus (G') by a factor of 10.

As the amount of polymerized cyclic olefin increases, the adhesive composition is typically not a pressure sensitive adhesive after polymerizing the cyclic olefin. In this embodiment, the storage modulus (G') of the adhesive after polymerizing the cyclic olefin is at least (e.g. 25° C.) $3\times10^5$ Pa at a frequency of 1 Hz. In some embodiments, the adhesive composition has a storage modulus of a least than $4\times10^5$ Pa, $5\times10^5$ Pa, $6\times10^5$ Pa, $7\times10^5$ Pa, $8\times10^5$ Pa, $9\times10^5$ Pa, $1\times10^6$ Pa, $2\times10^6$ Pa, $3\times10^6$ Pa, $4\times10^6$ Pa, $5\times10^6$ Pa or greater after polymerizing the cyclic olefin. In this embodiment, the adhesive composition may be characterized as a structural adhesive composition.

In some embodiments, the adhesive composition after polymerization of the cyclic olefin exhibits an overlap shear value with aluminum (or other substrates such as polycarbonate and nylon) of at least 100 kPa. In some embodiments, the adhesive composition after polymerization of the cyclic olefin exhibits an overlap shear value of at least 200, 300, 400, 500 600, 700, 800, 900, 1000 kPa. In some embodiments, the adhesive composition after polymerization of the cyclic olefin exhibits an overlap shear value of at least 1500, 2000, 2500, 3000, 3500, or 4000 kPa. In some embodiments, the overlap shear failure mode is cohesive failure, which is an indication of good adhesion to the substrate.

Objects and advantages of this invention are further illustrated by the following examples. The particular materials and amounts, as well as other conditions and details, recited in these examples should not be used to unduly limit this invention.

Examples

Unless otherwise noted or readily apparent from the context, all parts, percentages, ratios, etc. in the Examples and the rest of the specification are by weight.

TABLE 1

Materials Used in the Examples

| Abbreviation | Description and Source |
|---|---|
| Acrylic Polymer A | An acrylic polymer with a composition (by weight) of 45%/45%/10% BA/THFA/HPA, used as a 50.7% solids solution in a mixture of approximately 2:1 toluene and ethyl acetate (EtOAc). The weight average molecular weight of the polymer was approximately 459,000 grams/mol by gel permeation chromatography (GPC) determination. |
| Acrylic Polymer B | An acrylic polymer with a composition (by weight) of 82%/10%/5%/3% 2EHA/2EHMA/Acm/HEA, used as a 51.6% solids solution in EtOAc. The weight average molecular weight of the polymer was approximately 381,000 grams/mol by GPC determination. |
| Acrylic Polymer C | An acrylic polymer with a composition (by weight) of 82%/10%/5%/3% 2EHA/2EHMA/Acm/HEA, used as a 50.7% solids solution in EtOAc. The weight average molecular weight of the polymer was approximately 265,000 grams/mol by GPC determination. |
| THFA | Tetrahydrofurfuryl acrylate obtained from San Esters, New York, NY. Obtained under the trade designation V-150. |
| BA | n-Butyl acrylate from BASF Corp., Florham Park, NJ. |
| HPA | Hydroxypropyl acrylate (mixture of isomers) from BASF Corp. |
| 2EHA | 2-ethylhexyl acrylate from BASF Corp. |
| 2EHMA | 2-ethylhexl methacrylate from TCI America, Portland, OR. |
| Acm | Acrylamide from Zibo Xinye Chemical Company, Zibo, China. |
| HEA | 2-hydroxyethyl acrylate from BASF Corp. |
| HPR 2128 | Cyclic olefin resin obtained from Materia, Inc., Pasadena, CA. Obtained under the trade designation PROXIMA HPR 2128. |
| HTI 1400 | Cyclic olefin resin obtained from Materia, Inc.. Obtained under the trade designation PROXIMA HTI 1400. |
| Propylene carbonate | Propylene carbonate obtained from Huntsman Corporation, The Woodlands, TX. Obtained under the trade designation JEFFSOL PC. |
| Toluene | Toluene from EMD Millipore, Burlington, MA. |
| EtOAc | Ethyl acetate from VWR International, Radnor, PA. |
| VAZO-52 | 2,2'-azobis(2,4-dimethylpentanenitrile), thermal radical initiator obtained under the trade designation VAZO 52 from E. I. du Pont de Nemours & Co., Wilmington, DE. |
| TDDM | Tertiary dodecyl mercaptan from Sartomer Co., Exton, PA. |
| RL1 | A siliconized polyester film release liner obtained from 3M Company, Maplewood, MN. |
| CT762 | Olefin metathesis catalyst (1% in mineral oil) from Materia, Inc. Obtained under the trade designation PROXIMA CT 762. |

TABLE 1-continued

Materials Used in the Examples

| Abbreviation | Description and Source |
|---|---|
| AcI | A ruthenium-based olefin metathesis catalyst, prepared as described in *J. Am. Chem. Soc.* 2009, 131, 2036-2039. |
| CII | A ruthenium-based olefin metathesis catalyst, prepared as described in *J. Am. Chem. Soc.* 2002, 124, 1580-1581 using Schlenk techniques rather than a glove box. The final product was further purified via automatic flash column chromatography. |
| TASCl | Triarylsulfonium chloride photoacid generator obtained from Aceto Corporation, Port Washington, NY and dried to a powder. |
| MOST | 2,4-Bis(trichloromethyl)-6-(p-methoxystyryl)-s-triazine from Eutec Co Ltd, Taipei, Taiwan. |
| IOTG | Isooctyl thioglycolate from Arkema, Exton, PA. |
| MA-130 | Maleinized butadiene resin from Cray Valley, Exton, PA. Obtained under the trade designation RICON MA-130. |

Test Methods

Coated Adhesive Composition Preparation

A selected adhesive composition (in EtOAc/MEK solution) was coated onto the tight side of an RL1 siliconized polyester release liner using a box coater for a wet gap of 20 mil or 25 mil (0.51 millimeters (mm) or 0.64 mm) and dried for 30 minutes in a solvent oven at 50° C.

Dynamic Overlap Shear Test Method Sample Preparation 1 inch×4 inches×0.064 inch (2.5 centimeter (cm)×10.2 cm×0.16 cm) aluminum substrates were prepared by scrubbing the terminal 1 inch (2.54 cm) with a SCOTCH-BRITE GENERAL PURPOSE HAND PAD #7447 (3M, Maplewood, MN) followed by washing with isopropanol and air-drying. A ½ inch×1 inch (1.3 cm×2.5 cm) portion of the coated adhesive composition was applied to the scrubbed end of one substrate. The release liner was removed. Some of the open adhesive samples were subjected to a light treatment (see Table 2 below). A second substrate was applied to the sample, thus closing the bond (bond area ½ inch×1 inch (1.3 cm×2.5 cm)). The amount of radiation applied to each sample was measured by an E2T PowerPuck II radiometer (EIT, Inc., Sterling, VA). All assemblies were wet out by means of applying finger pressure. The bonds were clamped with large binder clips and allowed to sit at either at room temperature or in a 80° C. or 90° C. oven for 18-24 hours prior to testing (see Table 2).

TABLE 2

Heat and Light Treatments for Overlap Shear Samples

| Method | UV irradiation (Fusion*; 4.0 J/cm² UVA, 0.9 J/cm² UVB, 0.3 J/cm² UVC, 3.9 J/cm² UVV) | UV irradiation (Fusion*; 2.0 J/cm² UVA, 0.5 J/cm² UVB, 0.2 J/cm² UVC, 2.2 J/cm² UVV) | UV irradiation (LED**; 2.0 J/cm² UVA, 0.0 J/cm² UVB, 0.1 J/cm² UVC, 0.3 J/cm² UVV) | 24 hours at RT*** | 24 hours at 80° C. | 24 hours at 90° C. |
|---|---|---|---|---|---|---|
| M1 Control | — | — | — | Yes | — | — |
| M2 | — | — | — | — | Yes | — |
| M3 | — | — | — | — | — | Yes |
| M4 | Yes | — | — | Yes | — | — |
| M5 | — | Yes | — | Yes | — | — |

TABLE 2-continued

Heat and Light Treatments for Overlap Shear Samples

| Method | UV irradiation (Fusion*; 4.0 J/cm² UVA, 0.9 J/cm² UVB, 0.3 J/cm² UVC, 3.9 J/cm² UVV) | UV irradiation (Fusion*; 2.0 J/cm² UVA, 0.5 J/cm² UVB, 0.2 J/cm² UVC, 2.2 J/cm² UVV) | UV irradiation (LED**; 2.0 J/cm² UVA, 0.0 J/cm² UVB, 0.1 J/cm² UVC, 0.3 J/cm² UVV) | 24 hours at RT*** | 24 hours at 80° C. | 24 hours at 90° C. |
|---|---|---|---|---|---|---|
| M6 | — | — | Yes | Yes | — | — |
| M7 | Yes | — | — | — | — | Yes |
| M8 | — | Yes | — | — | Yes | — |
| M9 | — | — | Yes | — | Yes | — |

*D Bulb microwave source (Heraeus Noblelight America. Gaithersburg, MD)
**365 nm LED Head OMNICURE 7300 (Excelitas Technologies, Waltham, MA)
***RT = room temperature Dynamic Overlap Shear Test A dynamic overlap shear test was performed at ambient temperature using a MTS CRITERION MODEL 43 tensile tester (MTS, Eden Prairie, MN) equipped with an LPS.104 C 30 kN load cell (MTS, Eden Prairie, MN). Test specimens were loaded into the grips and the crosshead was operated at 0.1 inch (0.25 cm) per minute, loading the specimen to failure. Stress at break was recorded in units of pounds per square inch (psi) and converted to kilopascals (kPa). Three specimens of each sample were tested, and the average result calculated.

Rheological Test Method: Frequency Sweep followed by Temperature Ramp

The examples were analyzed by Dynamic Mechanical Analysis (DMA) using a DHR-3 parallel plate rheometer (TA Instruments, New Castle, DE, USA) to characterize the physical properties of each sample as a function of temperature. Rheology samples were coated into an adhesive film between silicone-coated release liners approximately 1 mm thick, achieved by laminating together. Films were then punched out with an 8 mm circular die, removed from the release liner, centered between 8 mm diameter parallel plates of the rheometer, and compressed until the edges of the sample were uniform with the edges of the top and bottom plates.

The temperature was ramped in three steps while the parallel plates were oscillated at an angular frequency of 1 Hertz. During the first two steps, samples were run under an axial force control of 70 grams with a sensitivity of +/−50 grams and conditioned at the start temperature of 25° C. for 120 seconds prior to starting the frequency sweep test. A frequency sweep was run from 0.1 to 100 rad/s at a constant strain of 1 percent. The temperature was then ramped to 40° C. for 180 seconds prior to starting the temperature ramp test. The temperature was then ramped down from 40° C. to −50° C. at 3° C./min with a constant strain of 1 percent until the oscillatory stress exceeded 25,000 Pa, at which point the test was automatically changed to a constant stress of 25,000 Pa for the remainder of the temperature ramp step. A step termination condition was enabled to stop the low temperature ramp if the storage modulus (G') exceeded 4×10d8 Pa to prevent delamination of the adhesive sample from the fixtures.

For the third step of the temperature ramp test, the axial force was reduced to an axial force control of 25 grams with a sensitivity of +/−30 grams and conditioned at the start temperature of 30° C. for 60 seconds prior to starting this step. The temperature was then ramped from 30° C. to 150° C. at 3° C./min while the parallel plates were oscillated at an angular frequency of 1 Hertz and a constant strain of 5 percent. A step termination condition was enabled to stop the high temperature ramp if the storage modulus (G') dropped below 100 Pa to prevent oozing of the adhesive sample from the fixtures. The storage modulus at 1 rad/s and 6.3 rad/s were recorded from the frequency sweep. The maximum tan(delta) was recorded as the Tg from the temperature ramp.

Gel Permeation Chromatography (GPC)

The molecular weight distribution of the compounds was characterized using conventional gel permeation chromatography (GPC). The GPC instrumentation, which was obtained from Waters Corporation (Milford, MA), included a high pressure liquid chromatography pump (Model 1515HPLC), an auto-sampler (Model 717), a UV detector (Model 2487), and a refractive index detector (Model 2410). The chromatograph was equipped with two 5 micrometer PLgel MIXED-D columns, available from Varian Inc. (Palo Alto, CA).

Samples of polymeric solutions were prepared by dissolving polymer or dried polymer materials in tetrahydrofuran at a concentration of 0.5 percent (weight/volume) and filtering through a 0.2 micrometer polytetrafluoroethylene filter that was available from VWR International (West Chester, PA). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight ("Mw") and the polydispersity index (weight average molecular weight divided by number average molecular weight) were calculated for each sample against this standard calibration curve.

Preparatory Examples

Synthesis of Acrylic Polymer A

Acrylic Polymer A was prepared by adding 45 grams (g) of BA, 45 g of THFA, 3 g of HPA, 1 g of VAZO 52, 0.1 g of IOTG, and 98 g of EtOAc to a glass bottle. The contents were mixed and bubbled with nitrogen for 2 minutes before being sealed and placed in a Laundrometer rotating water bath (SDL Atlas, Rock Hill, SC) for 24 hours at 60° C. After 24 hours the sample was removed from the Laundrometer and cooled under ambient conditions. The sample was analyzed using GPC to determine a Mw of 459,000 g/mol and a polydispersity index of 5.97. Before use in these examples, the solution was partially dried under a stream of nitrogen and the lost solvent replaced with toluene. The solvent in the final mixture was 2:1 toluene:EtOAc.

Synthesis of Acrylic Polymer B

Acrylic Polymer B was prepared by adding 82 g of 2EHA, 10 g of 2EHMA, 5 g of Acm, 3 g of HEA, 0.15 g of VAZO 52, 0.05 g of TDDM, and 96.2 g of ethyl acetate to a glass bottle. The contents were mixed and bubbled with nitrogen for 2 minutes before being sealed and placed in a Laundrometer rotating water bath (SDL Atlas, Rock Hill, SC) for 24 hours at 60° C. After 24 hours the sample was removed from the Laundrometer and cooled under ambient conditions. The sample was analyzed using GPC to determine a Mw of 381,000 g/mol and a polydispersity index of 4.3.

Synthesis of Acrylic Polymer C

Acrylic Polymer C was prepared by adding 82 g of 2EHA, 10 g of 2EHMA, 5 g of Acm, 3 g of HEA, 0.15 g of VAZO 52, 0.10 g of TDDM, and 96.2 g of ethyl acetate to a glass bottle. The contents were mixed and bubbled with nitrogen for 2 minutes before being sealed and placed in a Laundrometer rotating water bath (SDL Atlas, Rock Hill, SC) for 24 hours at 60° C. After 24 hours the sample was removed from the Laundrometer and cooled under ambient conditions. The sample was analyzed using GPC to determine a Mw of 265,000 g/mol and a polydispersity index of 3.7.

Examples

Example 1 (EX-1): Heat-Cured Tape with CT762

The formulation in Table 3 was assembled in a plastic cup, stirred by hand, and then mixed in a DAC 150.1 FVZ-K speedmixer (FlackTek, Inc., Landrum, SC) at 2000 revolutions per minute (rpm) for 1 minute.

TABLE 3

Adhesive composition of Example 1

| | Acrylic Polymer A solution (50.7 wt. % in EtOAc/toluene), g | HPR 2128, g | CT762 solution (1 wt. % in mineral oil), g |
|---|---|---|---|
| Formulation | | | |
| EX-1 | 9.67 (4.90 g polymer) | 3.33 | 0.05 (0.5 mg catalyst) |

Formulation EX-1 was made into a coated adhesive composition according to the general procedure described above (25 mil coating gap). Overlap shear samples were made according to the general procedure described above. Methods and results can be found in Table 4.

TABLE 4

Overlap shear sample treatments and test results for Example 1

| Sample | Method | Average OLS strength, psi (kPa) | Failure mode |
|---|---|---|---|
| 1-A Control | M1 | 3.6 ± 0.1 (24.8 ± 0.6) | Cohesive |
| 1-B | M3 | 56.6 ± 4.2 (389.8 ± 29.0) | Adhesive |

Example 2 (EX-2): Light-Cured Tape with AcI and MOST

The formulation in Table 5 was assembled in a plastic cup, stirred by hand, and then mixed in a DAC 150.1 FVZ-K speedmixer at 2000 rpm for 1 minute.

TABLE 5

Adhesive composition for Example 2

| | Acrylic Polymer A solution (50.7 wt % in EtOAc/toluene), g | HPR 2128, g | AcI solution (11.5 wt % in toluene), g | MOST solution (5.7 wt % toluene), g |
|---|---|---|---|---|
| Formulation | | | | |
| EX-2 | 9.67 (4.90 g polymer) | 3.33 | 1.29 (148 mg AcI) | 2.77 (159 mg MOST) |

Formulation EX-2 was made into a coated adhesive composition according to the general procedure described above (25 mil coating gap). Overlap shear samples were made according to the general procedure described above. Methods and results can be found in Table 6.

TABLE 6

Overlap shear sample treatments and test results for Example 2

| Sample | Method | Average OLS strength, psi (kPa) | Failure mode |
|---|---|---|---|
| 2-A Control | M1 | 3.1 ± 0.2 (21.1 ± 1.7) | Cohesive |
| 2-B | M4 | 4.2 ± 0.6 (29.2 ± 4.0) | Mixed Adhesive |
| 2-C | M7 | 41.2 ± 2.1 (283.8 ± 14.6) | Mixed Adhesive |

Example 3 (EX-3): Light-Cured Tape with Ru CII and MOST

The formulation in Table 7 was assembled in a plastic cup, stirred by hand, and then mixed in a DAC 150.1 FVZ-K speedmixer at 2000 rpm for 1 minute.

TABLE 7

Adhesive composition for Example 3

| Formulation | Acrylic Polymer A solution (50.7 et % in EtOAc/toluene), g | HPR 2128, g | CII solution (5.6 wt % in toluene), g | TASCl solution (50 wt % in propylene carbonate), g |
|---|---|---|---|---|
| EX-3 | 9.67 (4.90 g polymer) | 3.33 | 0.250 (14 mg CII) | 0.034 (17 mg TASCl) |

Formulation EX-3 was made into a coated adhesive composition according to the general procedure (25 mil coating gap). Overlap shear samples were made according to the general procedure. Methods and results can be found in Table 8.

TABLE 8

Overlap shear sample treatments and test results for Example 3

| Sample | Method | Average OLS strength, psi (kPa) | Failure mode |
|---|---|---|---|
| 3-A Control | M1 | 2.8 ± 0.3 (19.1 ± 1.8) | Cohesive |
| 3-B | M4 | 105.5 ± 6.4 (727.7 ± 44.3) | Cohesive |
| 3-C | M3 | 183.8 ± 12.4 (1267.5 ± 85.3) | Mixed Adhesive |
| 3-D | M7 | 132.7 ± 13.0 (914.7 ± 89.4) | Mixed Adhesive |

Examples 4 through 7 (EX-4 to EX-7): Light-Cured Tape with Higher-$T_g$ Acrylic Polymer The formulations in Table 9 were made as follows. First, the Acrylic Polymer B solution and the HPR 2128 were assembled in a plastic cup and mixed in a DAC 150.1 FVZ-K speedmixer at 2500 rpm for 1 minute. Then, the remaining ingredients were added to the cup and mixed in the same speedmixer at 2500 rpm for 1 minute.

TABLE 9

Adhesive compositions for Examples 4-7

| Formulation | Acrylic Polymer B solution (51.6% solids in EtOAc), g | HPR 2128, g | CII solution (5 wt % in toluene), g | TASCl solution (20 wt % in propylene carbonate), g | CII solution (10 wt % in toluene), g | TASCl solution (16.7 wt % in toluene), g | MA-130, g |
|---|---|---|---|---|---|---|---|
| EX-4 | 14.88 (7.68 g polymer) | 5.12 | 0.421 (21 mg CII) | 0.110 (22 mg TASCl) | — | — | — |
| EX-5 | 7.44 (3.84 g polymer) | 2.56 | 0.211 (11 mg CII) | 0.065 (13 mg TASCl) | — | — | 0.250 |
| EX-6 | 10.24 (5.28 g polymer) | 1.76 | — | — | 0.120 (12 mg CII) | 0.090 (15 mg TASCl) | — |
| EX-7 | 4.71 (2.43 g polymer) | 7.29 | — | — | 0.170 (17 mg CII) | 0.120 (20 mg TASCl) | — |

Formulations EX-4 through EX-7 were made into coated adhesive compositions according to the general procedure described above (20 mil coating gap). Overlap shear samples were made according to the general procedure described above, with the exception of Sample 5-B3, which was made using 1 inch×4 inches×0.130 inch (2.5 cm×10.2 cm×0.33 cm) Nylon 6,6 coupons in place of aluminum coupons. These Nylon coupons were not abraded, but rather wiped with IPA. Methods and results can be found in Table 10.

TABLE 10

Overlap shear sample treatments and test results for Examples 4-7

| Sample | Method | Average OLS strength, psi (kPa) | Failure mode |
|---|---|---|---|
| 4-A Control | M1 | 6.3 ± 0.5 (43.7 ± 3.7) | Cohesive |
| 4-B | M2 | 397.3 ± 51.5 (2739.6 ± 355.0) | Mixed Adhesive |
| 4-C | M5 | 92.0 ± 13.6 (634.3 ± 93.7) | Mixed Adhesive |
| 4-D | M8 | 344.0 ± 20.4 (2371.9 ± 140.6) | Mixed Adhesive |
| 4-E | M6 | 18.7 ± 1.2 (128.7 ± 8.6) | Cohesive |
| 4-F | M9 | 410.7 ± 36.9 (2831.5 ± 254.3) | Mixed Adhesive |
| 5-A | M5 | 85.3 ± 5.7 (588.4 ± 39.5) | Mixed Adhesive |
| 5-B (Nylon) | M5 | 45.0 ± 6.2 (310.3 ± 42.5) | Adhesive |
| 6-A Control | M1 | 10.6 ± 0.6 (72.9 ± 4.2) | Cohesive |
| 6-B | M2 | 349.3 ± 58.7 (2408.7 ± 404.8) | Mixed Adhesive |
| 6-C | M5 | 74.7 ± 5.3 (514.8 ± 36.6) | Mixed Adhesive |

TABLE 10-continued

Overlap shear sample treatments and test results for Examples 4-7

| Sample | Method | Average OLS strength, psi (kPa) | Failure mode |
|---|---|---|---|
| 6-D | M8 | 256 ± 11.0 (1765.1 ± 76.2) | Mixed Adhesive |
| 7-A Control | M1 | 7.4 ± 0.2 (51.3 ± 1.4) | Cohesive |
| 7-B | M2 | 698.3 ± 30.0 (4815 ± 206.6) | Mixed Adhesive |
| 7-C | M5 | 348.0 ± 13.6 (2399.5 ± 94.0) | Adhesive |
| 7-D | M8 | 545.7 ± 36.6 (3762.4 ± 252.2) | Adhesive |

Example 8 (EX-8): Light-Cured Tape with Higher-$T_g$ Acrylic Polymer and Norbornene-Containing Resin The formulation in Table 11 was assembled in a plastic cup and mixed in a DAC 150.1 FVZ-K speedmixer at 2000 rpm for 1 minute.

TABLE 11

Adhesive Composition for Example 8

| Formulation | Acrylic Polymer B solution (51.6% solids in EtOAc), g | HTI 1400, g | CII solution (5 wt % in toluene), g | TASCl solution (20 wt % in propylene carbonate), g |
|---|---|---|---|---|
| EX-8 | 14.5 | 5.0 | 0.421 (21 mg CII) | 0.110 (22 mg TASCl) |

Formulation EX-8 was made into a coated adhesive composition according to the general procedure described above (20 mil coating gap). Overlap shear samples were made according to the general procedure described above, with the exception of Sample 8-E, which was made using 1 inch×4 inches×0.175 inch (2.5 cm×10.2 cm×0.44 cm) polycarbonate coupons in place of aluminum coupons. These polycarbonate coupons were not abraded, but rather wiped with IPA. Methods and results can be found in Table 12.

TABLE 12

Overlap shear sample treatments and test results for Example 8

| Sample | Method | Average OLS strength, psi (kPa) | Failure mode |
|---|---|---|---|
| 8-A Control | M1 | 5.0 ± 0.3 (34.7 ± 1.8) | Mixed Adhesive |
| 8-B | M2 | 355.7 ± 81.8 (2452.3 ± 563.9) | Cohesive |
| 8-C | M5 | 46.7 ± 4.5 (321.8 ± 31.0) | Mixed Adhesive |
| 8-D | M9 | 291.0 ± 60.4 (2006.4 ± 416.5) | Adhesive |
| 8-E (polycarbonate) | M5 | 21.0 ± 3.6 (144.8 ± 24.5) | Adhesive |

Examples 9 through 12 (EX-9 to EX-12): Rheological Measurements on Resin Portions of Adhesive Compositions The formulations in Table 13 were prepared as follows. EX-9, EX-10, and EX-11 were prepared according to the formulation and procedure outlined for EX-6, EX-4, and EX-7, respectively, except without the catalyst, photoacid, and solvent additives. Formulations EX-12 and EX-13 were simply portions of Acrylic Polymers A or B, according to Table 13. EX-14, EX-15, EX-16 were prepared in the same manner as EX-9, EX-10, and EX-11 respectively except for the addition of a catalyst.

TABLE 13

Compositions and sample thicknesses for rheological measurements

| Formulation | Acrylic Polymer A solution (50.7 wt % in EtOAc), g | Acrylic Polymer B solution (51.6% solids in EtOAc), g | Acrylic Polymer C solution (50.7% solids in EtOAc), g | HPR 2128, g | CT762 solution, 1 wt % in mineral oil, g |
|---|---|---|---|---|---|
| EX-9 | — | 10.24 (5.28 g polymer) | — | 1.76 | — |
| EX-10 | — | — | 11.8 (5.98 g polymer) | 4.00 | — |
| EX-11 | — | 4.71 (2.43 g polymer) | — | 7.29 | — |
| EX-12 Control | 15.00 (7.61 g polymer) | — | — | — | — |
| EX-13 Control | — | 15.00 (7.74 g polymer) | — | — | — |
| EX-14 | — | 14.60 (7.53 g polymer) | — | 2.50 | 0.1 (1 mg catalyst) |
| EX-15 | — | — | 11.8 (5.98 g polymer) | 4.00 | 0.1 (1 mg catalyst) |
| EX-16 | — | 4.80 (2.48 g polymer) | — | 7.50 | 0.1 (1 mg catalyst) |

The formulations in Table 13 were made into coated adhesive compositions according to the general procedure described above (20 mil coating gap). The dried adhesive films were folded on themselves 3 times to reach a sample thickness of 1-2 mm. Examples 9-13 were tested as is. Examples 14-16 were placed in an 80° C. oven for 24 hr and then returned to ambient conditions. The samples were then tested according to the Rheometry Methods in the General Procedure section. The results can be found in Table 14.

TABLE 14

Rheometry results for uncured/unactivated tape compositions.

| Sample | tan(delta) at 1 rad/s (0.16 Hz) | G' at 1 rad/s (0.16 Hz), Pa | tan(delta) at 6.3 rad/s (1 Hz) | G' at 6.3 rad/s (1 Hz), Pa | Maximum tan(delta) at 1 Hz, ° C. |
|---|---|---|---|---|---|
| EX-9 | 0.53 | 2.14E4 | 0.52 | 3.73E4 | −20° C. |
| EX-10 | 0.61 | 2.04E4 | 0.56 | 3.82E4 | −21° C. |

TABLE 14-continued

Rheometry results for uncured/unactivated tape compositions.

| Sample | tan(delta) at 1 rad/s (0.16 Hz) | G' at 1 rad/s (0.16 Hz), Pa | tan(delta) at 6.3 rad/s (1 Hz) | G' 6.3 rad/s (1 Hz), Pa | Maximum tan(delta) at 1 Hz, °C. |
|---|---|---|---|---|---|
| EX-11 | 0.84 | 8.25E4 | 0.77 | 1.22E4 | 12° C. |
| EX-12 Control - Acrylic Polymer A | 0.74 | 2.69E4 | 0.60 | 5.59E4 | −23° C. |
| EX-13 Control - Acrylic Polymer B | 0.50 | 4.08E4 | 0.57 | 6.87E4 | −11° C. |

TABLE 15

Rheometry results for cured tape compositions.

| Sample | tan(delta) at 1 rad/s (0.16 Hz) | G' at 1 rad/s (0.16 Hz), Pa | tan(delta) at 6.3 rad/s (1 Hz) | G' 6.3 rad/s (1 Hz), Pa | Maximum tan(delta) at 1 Hz, °C. |
|---|---|---|---|---|---|
| EX-14 | 0.40 | 2.37E5 | 0.44 | 3.69E5 | −8 |
| EX-15 | 0.34 | 1.39E6 | 0.35 | 2.03E6 | −8 |
| EX-16 | 0.29 | 4.61E6 | 0.31 | 6.35E6 | NA |

TABLE 16

Weight % Solids of Components of Adhesive Composition

| Formulation | Acrylic Polymer A, g | Acrylic Polymer B, g | Acrylic Polymer C, g | CT 762, g | HPR 2128, g | HTI 1400, g | AcI, g | MOST, g | CII, g | TASCl, g | Mineral oil, g | Ricon MA-130, g |
|---|---|---|---|---|---|---|---|---|---|---|---|---|
| EX-1 | 59.18% | — | — | 0.01% | 40.21% | — | — | — | — | — | 0.60% | — |
| EX-2 | 57.38% | — | — | — | 38.99% | — | 1.76% | 1.87% | — | — | — | — |
| EX-3 | 59.31% | — | — | — | 40.31% | — | — | — | 0.17% | 0.21% | — | — |
| EX-4 | — | 80.99% | — | — | 18.56% | — | — | — | 0.22% | 0.23% | — | — |
| EX-5 | — | 57.54% | — | — | 38.36% | — | — | — | 0.16% | 0.19% | — | 3.75% |
| EX-6 | — | 74.50% | — | — | 25.12% | — | — | — | 0.17% | 0.21% | — | — |
| EX-7 | — | 24.91% | — | — | 74.72% | — | — | — | 0.17% | 0.20% | — | — |
| EX-8 | — | 59.73% | — | — | — | 39.93% | — | — | 0.17% | 0.18% | — | — |
| EX-9 | — | 74.79% | — | — | 25.21% | — | — | — | — | — | — | — |
| EX-10 | — | — | 59.92% | — | 40.08% | — | — | — | — | — | — | — |
| EX-11 | — | 25.00% | — | — | 75.00% | — | — | — | — | — | — | — |
| EX-12 | 100.00% | — | — | — | — | — | — | — | — | — | 0.00% | — |
| EX-13 | — | 100.00% | — | — | — | — | — | — | — | — | — | — |
| EX-14 | — | 74.33% | — | 0.01% | 24.68% | — | — | — | — | — | 0.99% | — |
| EX-15 | — | — | 59.32% | 0.01% | 39.68% | — | — | — | — | — | 0.99% | — |
| EX-16 | — | 24.60% | — | 0.01% | 74.40% | — | — | — | — | — | 0.99% | — |

What is claimed is:

1. An adhesive article comprising:
a carrier substrate comprising a release liner or backing; and
an adhesive composition disposed on the carrier substrate, wherein the adhesive composition comprises
at least 20 wt. % of a polymer having a glass transition temperature (Tg) of less than 25° C.;
unpolymerized cyclic olefin; and
a latent ring opening metathesis polymerization catalyst or precatalyst thereof;
wherein the adhesive article is a tape.

2. The adhesive article of claim 1 wherein the polymer is a random polymer.

3. The adhesive article of claim 1 wherein the polymer is a (meth)acrylic polymer.

4. The adhesive article of claim 3 wherein the (meth) acrylic polymer comprises polymerized units of non-acid-functional polar monomers.

5. The adhesive article of claim 4 wherein the non-acid-functional polar monomers comprise hydroxyl, ether, or amide groups.

6. The adhesive article of claim 1 wherein the adhesive composition is a pressure sensitive adhesive having a storage modulus no greater than 0.3 MPa at a temperature of 25° C. and a frequency of 1 hertz prior to polymerization of the cyclic olefin.

7. The adhesive article of claim 1 wherein the adhesive composition is a pressure sensitive adhesive having a storage modulus no greater than 0.3 MPa at a temperature of 25° C. and a frequency of 1 hertz after polymerization of the cyclic olefin.

8. The adhesive article of claim 1 wherein the adhesive composition is not a pressure sensitive adhesive having a storage modulus greater than 0.3 MPa at a temperature of 25° C. and a frequency of 1 hertz after polymerization of the cyclic olefin.

9. The adhesive article of claim 1 wherein the polymer comprises at least 50, 60, 70, 80, or 90 wt. % of polymerized units of monomer having a Tg less than 0° C.

10. The adhesive article of claim 1 wherein the polymer lacks functional groups that copolymerize with the cyclic olefin.

11. The adhesive article of claim 1 wherein the cyclic olefin comprises moieties selected from cyclopentadiene, norbornene, and oligomers thereof.

12. The adhesive article of claim 1 wherein the cyclic olefin is present in an amount ranging from 10 to 80 wt. %.

13. The adhesive article of claim 1 wherein the catalyst is a ruthenium or osmium metal carbene catalyst.

14. The adhesive article of claim 1 wherein the latent catalyst is activated by heat, actinic radiation, a chemical compound, or a combination thereof and the chemical compound is an acid, photoacid generator, or thermal acid generator.

15. The adhesive article of claim 1 wherein the catalyst or precatalyst thereof is sufficiently latent such that the adhesive composition exhibits an overlap shear value with aluminum of less than 30 kPa after 24 hours at 25° C.

16. The adhesive article of claim 15 wherein the adhesive composition after polymerization of the cyclic olefin exhibits an overlap shear value with aluminum of at least 100 kPa.

* * * * *